(12) United States Patent
 Mattson

(10) Patent No.: US 9,615,058 B2
(45) Date of Patent: Apr. 4, 2017

(54) APPARATUS AND METHOD FOR SHARING CONTENT ITEMS AMONG A PLURALITY OF MOBILE DEVICES

(71) Applicant: Reel, Inc., Concord, MA (US)

(72) Inventor: William W. Mattson, Concord, MA (US)

(73) Assignee: Reel, Inc., Concord, MA (US)

( * ) Notice: Subject to any disclaimer, the term of this patent is extended or adjusted under 35 U.S.C. 154(b) by 0 days.

(21) Appl. No.: 14/730,891

(22) Filed: Jun. 4, 2015

(65) Prior Publication Data
US 2015/0358584 A1  Dec. 10, 2015

Related U.S. Application Data

(60) Provisional application No. 62/008,314, filed on Jun. 5, 2014.

(51) Int. Cl.
*H04N 7/14* (2006.01)
*H04N 7/15* (2006.01)
(Continued)

(52) U.S. Cl.
CPC ........... *H04N 7/15* (2013.01); *G06F 3/04842* (2013.01); *G06F 3/04847* (2013.01); *G06Q 10/101* (2013.01)

(58) Field of Classification Search
None
See application file for complete search history.

(56) References Cited

U.S. PATENT DOCUMENTS

| 8,681,203 B1* | 3/2014 | Yin | H04N 7/15 |
| | | | 348/14.08 |
| 2009/0010485 A1* | 1/2009 | Lamb | H04N 7/148 |
| | | | 382/100 |

(Continued)

FOREIGN PATENT DOCUMENTS

WO   WO 2014/035736 A2   3/2014   ............... H04N 7/15

OTHER PUBLICATIONS

International Searching Authority, International Search Report—International Application No. PCT/US2015/034188, dated Oct. 15, 2015, together with the Written Opinion of the International Searching Authority, 10 pages.

*Primary Examiner* — Maria El-Zoobi
(74) *Attorney, Agent, or Firm* — Sunstein Kann Murphy & Timbers LLP

(57) ABSTRACT

Embodiments of the present invention allow a collection of users (referred to herein as a "forum") to communicate and exchange content items as part of an interactive communication system (referred to herein as the "Reel service"). Each user has a mobile device (e.g., a mobile phone) running an application (referred to herein as the "Reel application"). The Reel application running in each mobile device is in communication with a server infrastructure. The Reel application implements client-side functions of the Reel service while the server infrastructure implements server-side functions of the Reel service. Users of a reel can create and share content items while simultaneously being able to monitor content being captured by other users through a single user interface, even on a mobile device where screen real estate is limited.

31 Claims, 38 Drawing Sheets
(32 of 38 Drawing Sheet(s) Filed in Color)

(51) Int. Cl.
    *G06F 3/0484*     (2013.01)
    *G06Q 10/10*      (2012.01)

(56) References Cited

U.S. PATENT DOCUMENTS

| | | | |
|---|---|---|---|
| 2011/0169909 A1* | 7/2011 | Gu | H04N 7/147 348/14.07 |
| 2012/0159472 A1* | 6/2012 | Hong | H04L 12/1813 717/178 |
| 2014/0129627 A1 | 5/2014 | Baldwin et al. | 709/204 |
| 2015/0100578 A1* | 4/2015 | Rosen | G06F 17/30598 707/737 |

* cited by examiner

Fig. 8    800

Reel Live Video Streaming
Cluster Logical Architecture

APPARATUS AND METHOD FOR SHARING CONTENT ITEMS AMONG A PLURALITY OF MOBILE DEVICES

CROSS-REFERENCE TO RELATED APPLICATION(S)

This patent application claims the benefit of U.S. Provisional Patent Application No. 62/008,314 entitled Apparatus and Method for Sharing Content Items among a Plurality of Mobile Devices filed on Jun. 5, 2014, which is hereby incorporated herein by reference in its entirety.

TECHNICAL FIELD

The present invention relates to video conferencing and content sharing over wide area networks, and more particularly to video conference and content sharing among mobile devices.

SUMMARY OF THE EMBODIMENTS

In accordance with one embodiment of the invention, apparatus comprising a tangible, non-transitory computer-readable medium is encoded with instructions that when run on a mobile device provide an application used in implementing a method of capturing and sharing content items among a plurality of mobile devices in communication with a server infrastructure over a network, wherein each mobile device runs the application and the application establishes its user as a party to a forum that shares a reel of content items via the server infrastructure. The method comprises receiving by the application running on a first mobile device, from the server infrastructure, a content item associated with the reel of content items, and causing display, by the application, of a first co-create screen on a display of the first mobile device, the first screen including (i) a main display area; (ii) an album area comprising a set of user-selectable album panes in which recorded content items associated with the reel are displayed; and (iii) a user-selectable capture control allowing the user (a) to selectively capture content from the main display area and (b) to cause posting of the captured content to the reel as a recorded content item.

In various alternative embodiments, causing display may include causing display of the received content item in the main display area of the first screen, in which case the user-selectable capture control may allow the user to selectively capture content from the received content item. The received content item may include a one-way video that is made available to parties to the forum, a live video stream from another party to the forum, an audio and/or video clip, a still picture, a document, or other type of content item. The present invention is not limited to any particular type or types of content items and can include any type of content item that can be shared by mobile devices.

In certain specific embodiments, the application may cause display of a user-selectable livebox pane overlaying a portion of the main display area of the first album screen and display of video from a camera of the first mobile device in the user-selectable livebox pane of the first screen, and may further cause a multi-party conferencing connection to be established between the user of the first mobile device and another party to the forum. In such embodiments, the application may cause display of a user-selectable camera control allowing a user to select a front camera of the first mobile device or a back camera of the first mobile device.

In such specific embodiments, upon receipt of an input from the user selecting the user-selectable livebox pane, the application may cause display of a multiview screen including a plurality of user-selectable panes, each pane associated with a distinct party to the forum and each pane displaying one of at least (i) a representation, derived by the server infrastructure from a live video stream being sent to the server infrastructure from a mobile device of such party, wherein the representation is dynamically updated in a low-bandwidth manner by the server infrastructure or (ii) an indication that such party is not sending a live video stream to the server infrastructure. Each pane may display the representation, an indication that such party is online but is not sending a live video stream to the server infrastructure, or an indication that such party is offline. Thereafter, responsive to receipt of a user input selecting one of the user-selectable panes of the multiview screen, wherein the pane displays the representation, the application may cause display of a third multiview screen including (i) a main content area in which is displayed a live video stream from selected one of the parties to the forum; and (ii) the user-selectable capture control allowing the user (a) to selectively capture content from the main content area of the third multiview screen and (b) to cause posting of the captured content to the reel as a recorded content item.

Alternatively, in such specific embodiments, upon receipt of an input from the user selecting the user-selectable livebox pane, the application may cause display of a second multiview screen including (i) a main display area in which is displayed video from the camera of the first mobile device; (ii) the user-selectable live box pane in which is present the received content; and (iii) the user-selectable capture control allowing the user (a) to selectively capture content from the main display area of the second multiview screen and (b) to cause posting of the captured content to the reel as a recorded content item. The application may cause display of the second multiview screen in such a way that it does not interrupt the multi-party video-conferencing connection. Thereafter, upon receipt of a second input selecting the user-selectable livebox pane, the application may cause display of a multiview screen including a plurality of user-selectable panes, each pane associated with a distinct party to the forum and each pane displaying one of at least a representation, derived by the server infrastructure from a live video stream being sent to the server infrastructure from a mobile device of such party, wherein the representation is dynamically updated in a low-bandwidth manner by the server infrastructure; or an indication that such party is not sending a live video stream to the server infrastructure. Each pane may display the representation, an indication that such party is online but is not sending a live video stream to the server infrastructure, or an indication that such party is offline. Thereafter, responsive to receipt of a user input selecting one of the user-selectable panes of the multiview screen, wherein the pane displays the representation, the application may cause display of a third multiview screen including (i) a main content area in which is displayed a live video stream from selected one of the parties to the forum and (ii) the user-selectable capture control allowing the user (a) to selectively capture content from the main content area of the third multiview screen and (b) to cause posting of the captured content to the reel as a recorded content item.

In certain other specific embodiments, upon receipt of an input from the user selecting one of the user-selectable panes of the multiview screen, wherein the pane displays the representation, the application may cause display of a third multiview screen including (i) a main content area in which is displayed a live video stream from selected one of the parties to the forum; and (ii) the user-selectable capture control allowing the user (a) to selectively capture content from the main content area of the third multiview screen and (b) to cause posting of the captured content to the reel as a recorded content item.

In various alternative embodiments, the method may further include causing, by the application, a multi-party conferencing connection to be established between the user of the first mobile device and such other party to the forum; and causing, by the application, display of a user-selectable camera-disable control allowing the user of the first mobile device to selectively enable and disable a local camera of the first mobile device, wherein the multi-party conferencing connection remains established regardless of whether the local camera is enabled or disabled, and when the local camera is enabled, the application sends a live video stream from the local camera to the server infrastructure for use over the multi-party conferencing connection.

In various alternative embodiment, the method may further include causing, by the application, display of the received content item in a user-selectable album pane in the album area of the first album screen; and upon receipt of a user input selecting such user-selectable album pane, causing, by the application, display of a second album screen including (i) a main content area in which is displayed the received content item; and (ii) the user-selectable capture control allowing the user (a) to selectively capture content from the main content area of the second album screen and (b) to cause posting of the captured content to the reel as a recorded content item.

In various alternative embodiments, the method may further include causing, by the application, display of video from a camera of the first mobile device in the main display area; and during display of such video from the camera of the first mobile device, causing display, by the application of the user-selectable capture control allowing the user to selectively capture content from such video.

In any of the above embodiments, posting of the captured content to the reel as a recorded content item may involve displaying the captured content in a user-selectable pane in the album area and sending the captured content to the server infrastructure to allow other parties to the forum to receive the captured content. Also, the application may allow the user to selectively post a captured content item to the reel as either a persistent recorded content item or a decayable recorded content item. Also, responsive to receipt of a text message from another party to the forum, the application may cause display of a pop-up text message window overlaying a portion of the main display area, the pop-up text message window displaying the received text message. The application may allow for a text messaging thread to overlie a live video stream or user's camera display, and if a multi-way conference is active, the application may allow the text message thread to be conducted in such a way that it does not interrupt the multi-way conference.

In various alternative embodiments, multi-way conferencing can be supported in a variety of ways. For example, one way is to allow only two-way video but allow the user to hear audio from two or more other users. Such multi-way audio conference can be user-selectable.

Embodiments of the invention may include a mobile device including a computer-readable medium encoded with instructions to perform any of the described methods. The present invention is not limited to any particular type or types of mobile devices.

Embodiments of the invention also may include any of the described methods

In accordance with another embodiment of the invention, a method of sharing content items among a plurality of mobile devices in communication with a server infrastructure over a network, where each mobile device runs an application that establishes its user as a party to a forum that shares a reel of content items via the server infrastructure, includes managing, by the server infrastructure, a listing of parties to the forum; managing, by the server infrastructure, the reel of content items, wherein the server infrastructure maintains a master registry of all content items; serving, by the server infrastructure, to an application running on a mobile device of each party to the forum, a user-specified set of content items in the reel of content items, wherein each distinct application is configured to cause display of a first co-create screen on a display of its associated mobile device, the first screen including an album area comprising a distinct set of user-selectable album panes in which recorded content items served by the server infrastructure and associated with the reel are displayed; and wherein managing the reel of content items further includes receiving, by the server infrastructure, from each distinct application, metadata characterizing the distinct set of user-selectable album panes and storing the metadata.

In various alternative embodiments, managing the listing of parties to the forum may include adding by the server infrastructure to the listing a user who has received over the network an invitation message to the forum and has manifested, over the network, acceptance of the invitation. Managing the reel of content items may include adding by the server infrastructure any content item posted by a party to the forum as an addition to the reel. Each distinct application may be further configured to cause display of a distinct user-selected video served by the server infrastructure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing features of embodiments will be more readily understood by reference to the following detailed description, taken with reference to the accompanying drawings, in which.

DETAILED DESCRIPTION OF SPECIFIC EMBODIMENTS

Figure 1:
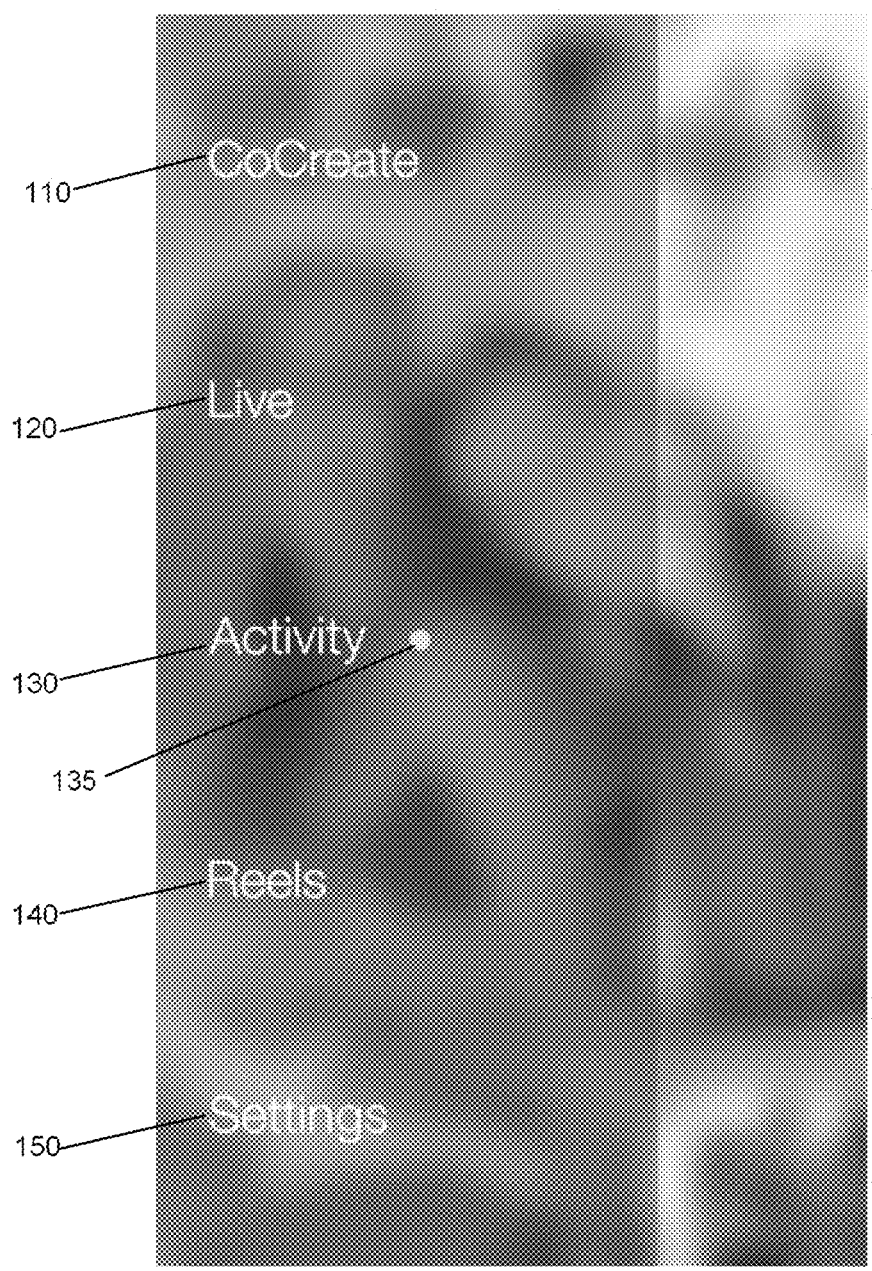
FIG. 1 is a representation of an exemplary main menu 100 of the Reel application running on a mobile device, in accordance with one exemplary embodiment.

Definitions. As used in this description and the accompanying claims, the following terms shall have the meanings indicated, unless the context otherwise requires:

A "mobile device" is a communication device, including a processor and at least one camera, that runs a Reel application as discussed herein and provides wireless communication between the Reel application and a server infrastructure that implements the server side of the Reel service as discussed herein.

A "server infrastructure" is a collection of one or more servers that together implement the server side of the Reel service as discussed herein.

An item of "content" is an item in a digital format that may be any of an item of pictorial content or an item of text. An item of pictorial content may optionally be a decaying content item. Video may be one-way, such as video from a device that provides only video (and possibly also audio) and cannot participate in a two-way conference, or may be two-way, such as a live video stream from a user capable of participating in a two-way conference.

An item of "pictorial content" is an item of content in a digital format that has been contributed by a party to the forum and may be any of a photograph or a video clip. An item of pictorial content may optionally be a decaying content item.

A "live video stream" is a video stream that is provided in real time. A "live video stream" that originates from a mobile device is one that results from a camera local to the mobile device.

A "forum" is a communication grouping, of a set of users, by which content and live streaming created by each one of the set of users can be shared among them.

To "post" a content item to a reel means to make the content item available to users of the reel. Content items are managed by the server infrastructure in a way that allows the Reel applications running on the user mobile devices to access and post content items associated with a reel.

A "set" includes at least one member.

A "reel" is a set of content items shared among parties to a forum.

A communication, such as in a video stream, occurs "in real time" when the content of the communication reflects activity that has occurred recently enough to be perceived as contemporaneous. Content of a video stream, for example, would typically be perceived as contemporaneous with an activity that gave rise the content, even when the content is delayed by a second or two from the activity giving rise to the content.

A "multi-party conferencing connection" is a connection, implemented by the server infrastructure, by which any given party to a forum can send to each of the other parties to the forum, a live video stream from the given party and receive, from at least any selected one of the other parties, a live video stream from the selected party, but wherein the given party can also inhibit sending of the live video stream from the given party. An application running on a mobile device can "cause" a multi-party video-conferencing connection to be established by invoking the server infrastructure to do so.

A feature is "selectable" or can be "selected" by a user of a mobile device that is running a program if the feature can be identified to the program by touching a portion of a touch-sensitive display screen where the feature is indicated or by indicating a menu choice, provided by the program, that pertains to the feature.

A "decayable" content item is an item of recorded content that has a limited lifetime existence, in a reel experienced by a party to a forum, that is limited by a duration of time in the reel or by a number of viewings by any given party to the forum. A "permanent" content item is an item of recorded content that does not have such a limited lifetime.

Embodiments of the present invention allow a collection of users (referred to herein as a "forum") to communicate and exchange content items as part of an interactive communication system (referred to herein as the "Reel service"). Each user has a mobile device (e.g., a mobile phone) running an application (referred to herein as the "Reel application"). The Reel application running in each mobile device is in communication with a server infrastructure. The Reel application implements client-side functions of the Reel service while the server infrastructure implements server-side functions of the Reel service.

FIGS. 1-19 are exemplary screenshots of various types of screens/views that are produced by the Reel application running on the mobile device and are used herein to demonstrate aspects of the user experience provided by the Reel application for communication and exchange of content items, in accordance with one exemplary embodiment.

Figure 3:
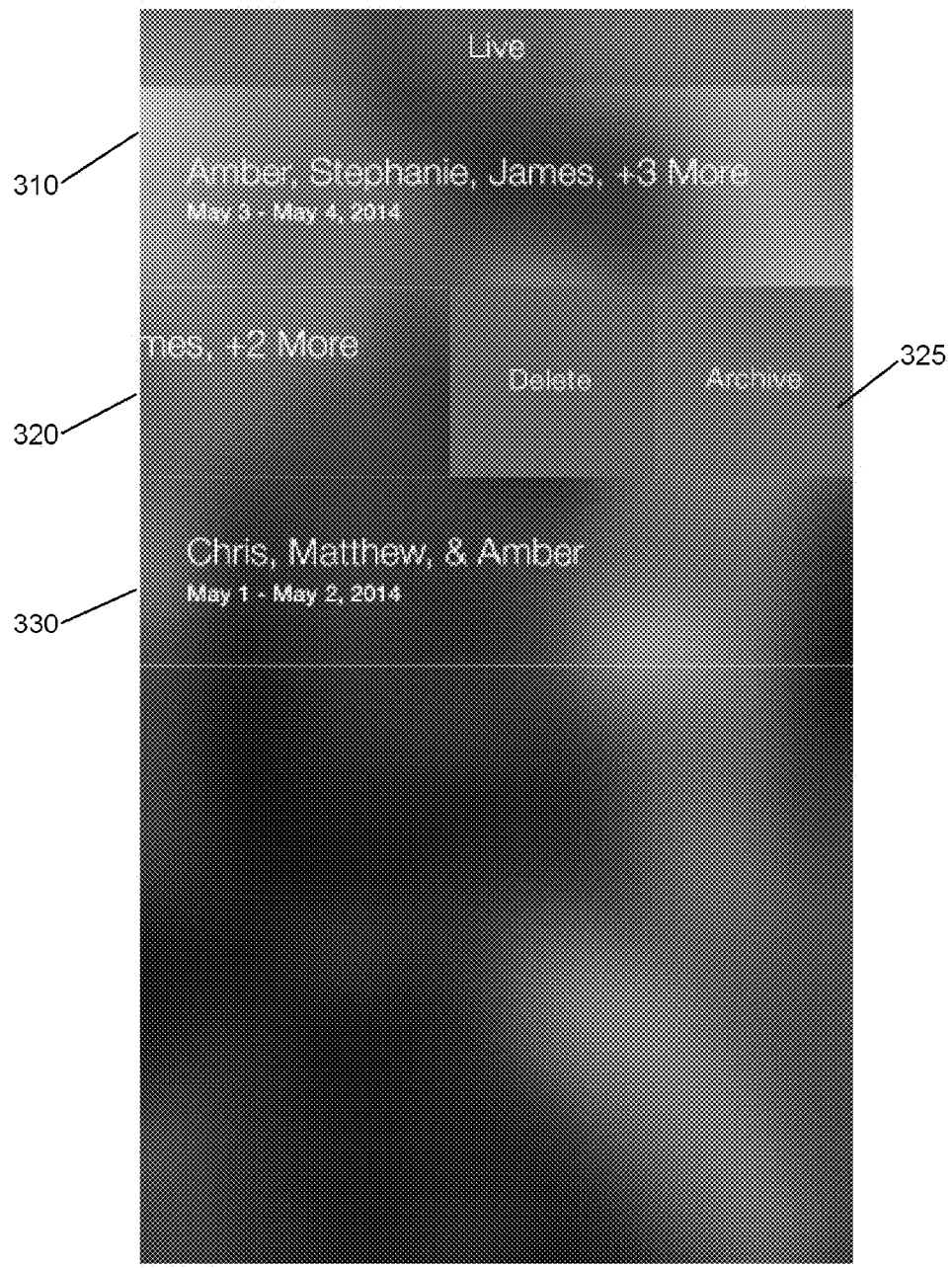
FIG. 3 is a representation of an exemplary Live view 300 within the application such as might be displayed when the user selects the Live menu item 120 on the main menu screen 100.
Figure 4:
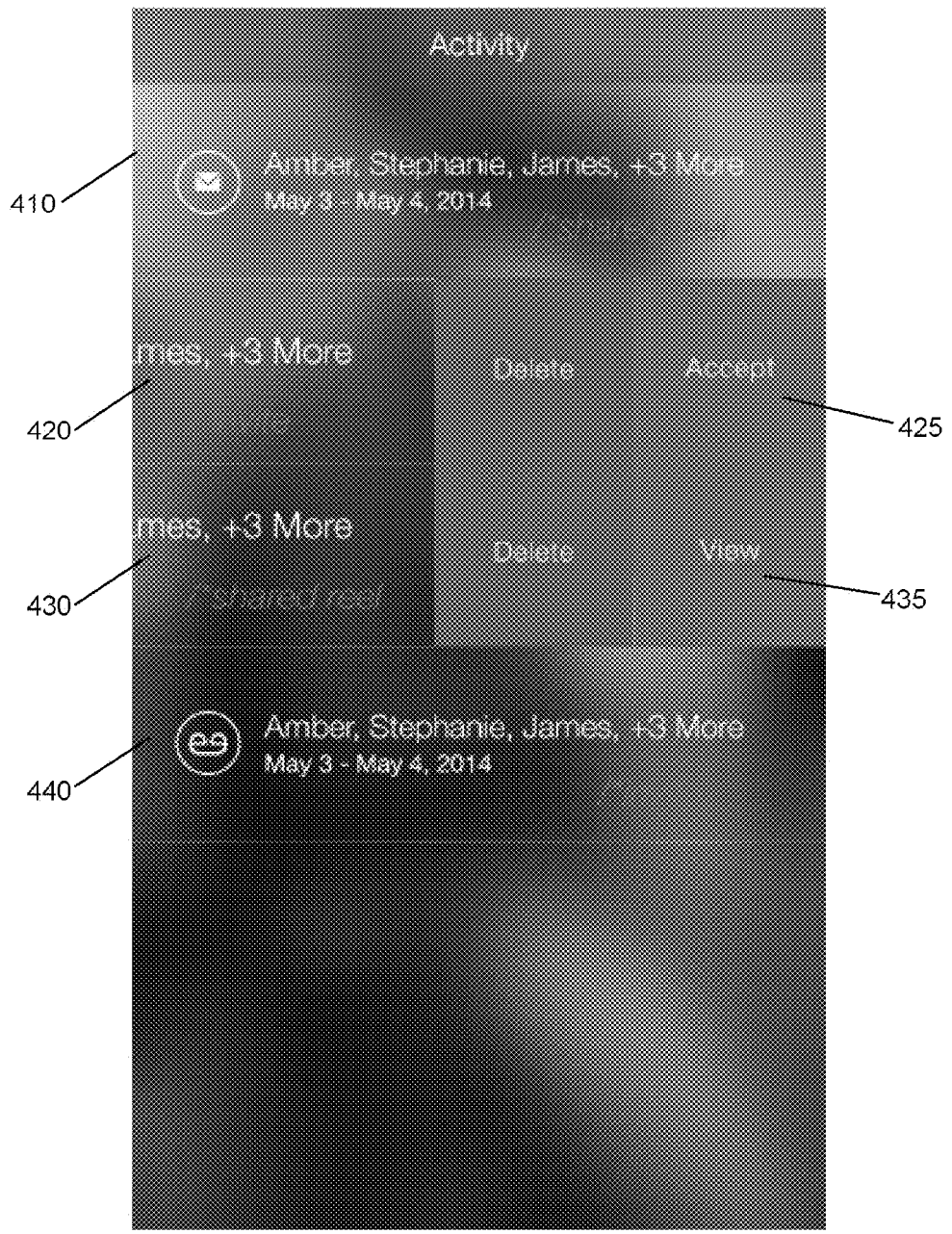
FIG. 4 is a representation of an exemplary Activity view 400 within the application such as might be displayed when the user selects the Activity menu item 130 on the main menu screen 100.

FIG. 1 is a representation of an exemplary main menu 100 of the Reel application running on a mobile device. The main menu 100 provides navigation through the various functional areas of the application. In this exemplary embodiment, the main menu 100 can be accessed by swiping right from the left edge of the screen and can be closed by dragging the edge of the menu left to the left edge of the screen, although other embodiments may provide access to the main menu in additional or alternative ways. The CoCreate menu item 110 provides one way for the user to create a new Reel, i.e., by inviting others to co-create before content has been created for the reel. The CoCreate menu item 110 brings user to Contacts & Invitation view (FIG. 2) to specify users to invite to a new Reel. The Live menu item 120 brings the user to a list of the currently active Reels in which the user is participating (FIG. 3). The Activity menu item 130 brings the user to a list of pending invitations to CoCreate in Reels created by other users (FIG. 4). A visual indicator 135 (in this exemplary embodiment, a colored dot) indicates whether new invitations are pending. The Reels menu item 140 brings the user to a list of past Reels in which the user participated but are no longer active. The Settings menu item 150 brings the user to a Global Settings view for the Reel application.

Figure 2:
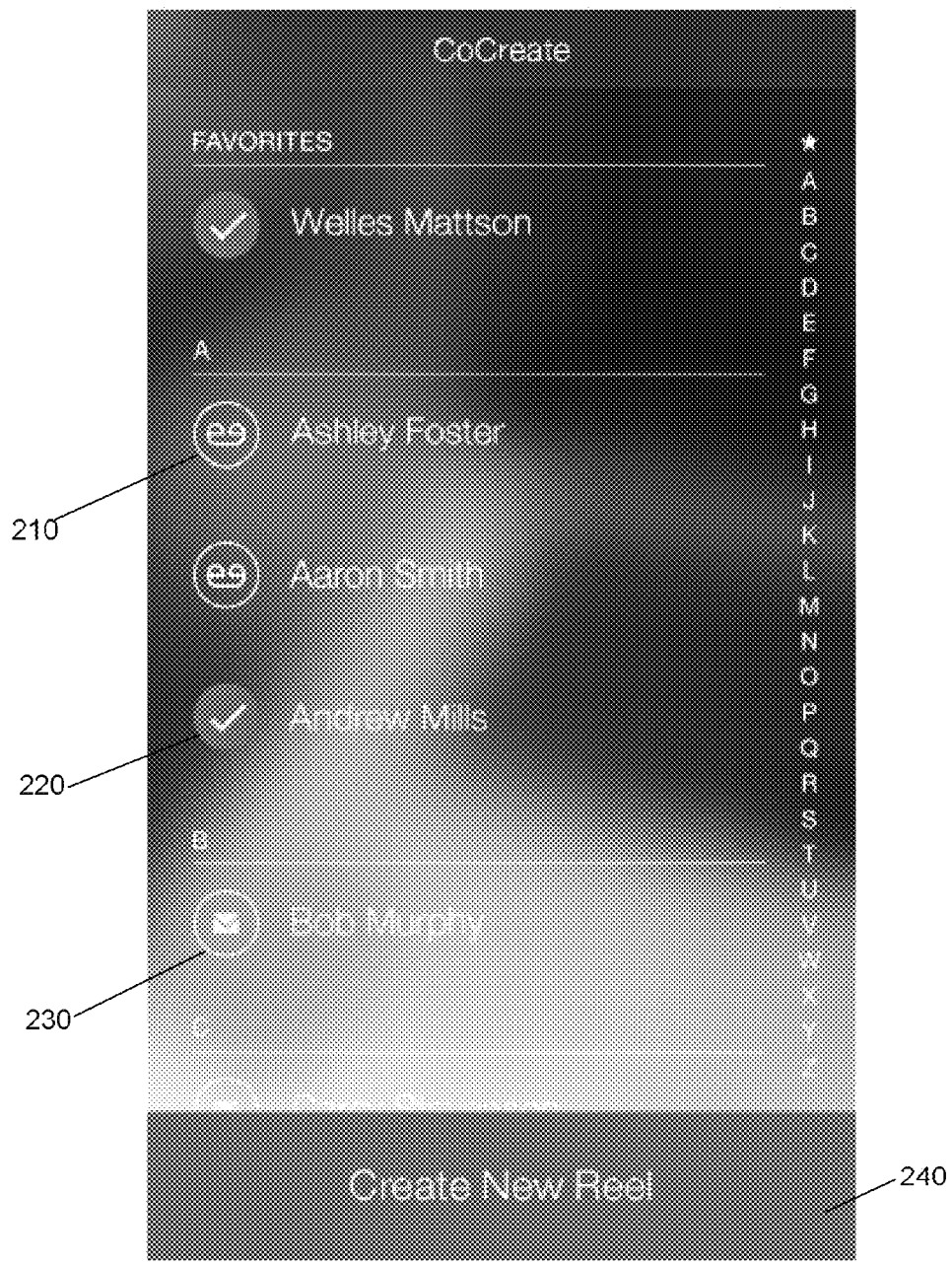
FIG. 2 is a representation of an exemplary Contacts & Invitation view 200 within the Reel application such as might be displayed when the user selects the CoCreate menu item 110 on the main menu screen 100.

FIG. 2 is a representation of an exemplary Contacts & Invitation view 200 within the Reel application such as might be displayed when the user selects the CoCreate menu item 110 on the main menu screen 100. The Contacts & Invitation view 200 allows the user to invite others to collaborate on a Reel (referred to herein as "CoCreating"). Importantly, this exemplary embodiment allows both existing users of the Reel service and users not yet registered with the Reel service to collaborate on a Reel.

In this exemplary embodiment, the contact list is grouped by letter of the alphabet (in this case based on first name, but could be based on last name). Contacts in the user's contact list that are already registered for Reel (e.g., with their mobile phone number, although other types of identifiers additionally or alternatively may be used in other embodiments) are indicated as existing members with the Reels icon 210. The Reels icon 210 can be tapped to select that user for invitation to CoCreate in the Reel. Contacts in the user's contact list that are not yet registered for Reel are displayed with an SMS icon 230 indicated that they will be invited via SMS text message. The SMS icon 230 can be tapped to select that user for invitation to CoCreate in the Reel. For users that will be invited via SMS text message, the automatically selected mobile phone number from the user's contact list will be displayed. Tapping on that phone number will yield a selector to choose the appropriate phone number to send the SMS invitation message. If at least one contact is selected, as indicated by a checkmark icon 220, a button 240 will display at the bottom of the screen which confirms the selection and invites the selected users. In certain embodiments, invitations sent by SMS messages will include a link to allow the recipient to download the Reel application.

FIG. 3 is a representation of an exemplary Live view 300 within the application such as might be displayed when the user selects the Live menu item 120 on the main menu screen 100. The Live view 300 allows the user to view all currently active Reels in which the user is participating. In this example, the user is a member of three currently active Reels 310, 320, and 330. The list of active reels is ordered by most recent (content) activity from any contributing cocreators in the forum. Tapping on a reel in the list view will resume cocreation by bringing the user to said reel's capture screen. Swiping horizontally across a reel in the list view will present the user with two options 325 that allow the user to end their active participation in said reel: delete/archive. Tapping the "Delete" button removes the user from said forum and the user's content created in said reel does not get saved to the user's Reels view (which itself hosts all permanent content created in a reel by the user and fellow cocreators). By selecting "Delete," the user only ends said forum (cocreation session) for themselves but does not end the forum cocreation session for fellow cocreators and content the user created in said reel will continue to remain in said forum for fellow cocreators to view. Tapping the "Archive" button removes the user from said forum, but unlike the alternative "Delete" option, all permanent content created by said user gets moved and saved to the user's Reels view (library).

FIG. 4 is a representation of an exemplary Activity view 400 within the application such as might be displayed when the user selects the Activity menu item 130 on the main menu screen 100. The Activity view 400 allows the user to see a list of both invitations to cocreate (sent by other contacts) and shared reel content (consisting of picture/video frames) that has been sent to the user by their respective contacts. In this example, there are four activity items 410, 420, 430, and 440. Invitations to cocreate are indicated by the Reel logo icon (two inward facing "e" letters that mirror each other) as shown in activity item 440. Shared reel content is represented by a single "e" icon (to suggest 1-way interaction). The list of cocreate invites and shared reels in the Activity view are ordered top-down from newest to oldest by date/time. The user can scroll vertically through the Activity list view.

Tapping on a cocreate invite in the Activity list view expands a dropdown list of contacts directly below, which indicates a list of all contacts that have been invited to cocreate by the initiating Reel user.

Swiping horizontally on a cocreate invitation such as activity item 420 displays two options 425: Delete and Accept. Tapping "Delete" (red button) will remove the cocreate invitation from the user's Activity. Tapping "Accept" (blue button) means the user has accepted the cocreate invite and is now brought to said reel's Capture screen where the user sees existing content created in the reel and has the ability to contribute content to it, as well as the text thread (hidden on the right side of the Capture screen).

Swiping horizontally on a shared reel such as activity item 430 displays two options 435: Delete and View. Tapping "Delete" (red button) will remove the shared reel from the user's Activity. Tapping "View" (blue button) allows the user to view the shared reel content of pictures and videos.

It should be noted that when a particular user leaves a reel, even a reel created by that user, content items associated with the reel, including content items created and posted by that user, remain in the reel.

Figure 5:
FIG. 5 is a representation of an exemplary Reels view 500 within the application such as might be displayed when the user selects the Reels menu item 140 on the main menu screen 100.

FIG. 5 is a representation of an exemplary Reels view 500 within the application such as might be displayed when the user selects the Reels menu item 140 on the main menu screen 100. The Reels view 500 is a library consisting of all past ("archived") reels a user has participated in as a cocreator. The Reels (library) view only consists of reels that a user "archived" (on the Live view screen). In this exemplary embodiment, published reels in this list view ONLY consist of permanent pictures and video frames, meaning: decaying frames are NEVER shared or saved either during live cocreation or when a user decides to end cocreation and selects "archive." Archived reels in the Reels view show all content created by the user, as well as all permanent frames created by fellow cocreators of said reel (even when the user exits the reel and fellow cocreators keep creating new content; in this scenario, picture and video frames get added to a user's archived reels after the fact). The list of archived reels is ordered top-down from newest to oldest by date/time. Each archived reel in the list view is identified by (default): the duration of the cocreation session by day/month (e.g., May 13-May 14, 2014), names of the cocreators. If the user titled their reel, than this title would appear at the top of every reel. Tapping on a reel in this list view brings the user to an album view (nearly identical to FIG. 18 drop down album view) where the user can now view frames in full-screen, as well as delete and share frames to contacts and networks.

Figure 6:
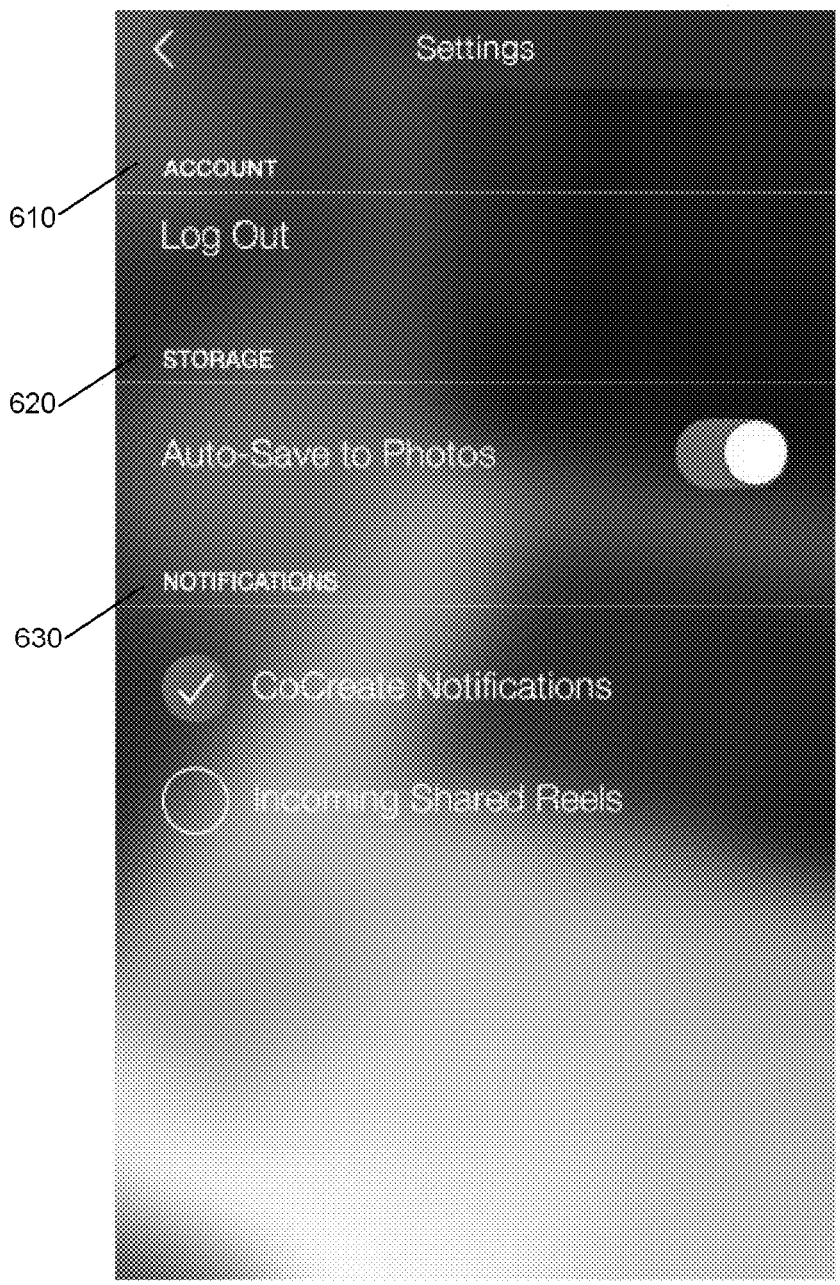
FIG. 6 is a representation of an exemplary Main Menu Settings view 600 within the application such as might be displayed when the user selects the Settings menu item 150 on the main menu screen 100.

FIG. 6 is a representation of an exemplary Main Menu Settings view 600 within the application such as might be displayed when the user selects the Settings menu item 150 on the main menu screen 100. From the Main Menu Settings view 600, the user can configure setting such as account settings 610 (e.g., log in/out of the user's account, change the first and last name of the user's account, etc.), storage settings 620 (e.g., whether or not to automatically save created content items to a Photos folder), and notification settings 630 (e.g., turn on/off push notifications that alert the user to new activity when the user is not active in the Reel application on their mobile device, such as whether or not the user if notified of incoming cocreate invitations and whether or not the user is notified of incoming shared reel invitations). The Settings view 600 also provides the user with a "walkthrough" tutorial of how the Reel application works, FAQ and Terms of Service. While not shown in FIG. 6, certain exemplary embodiments will allow the user to configure additional settings such as personalizing CoCreation Default Settings, turn on/off visibility, and add personal devices to the user's Reel account so as to allow the user to sync and cocreate in real-time with Internet-connected mobile devices (e.g. Google Glass, GoPro camera).

Figure 7:
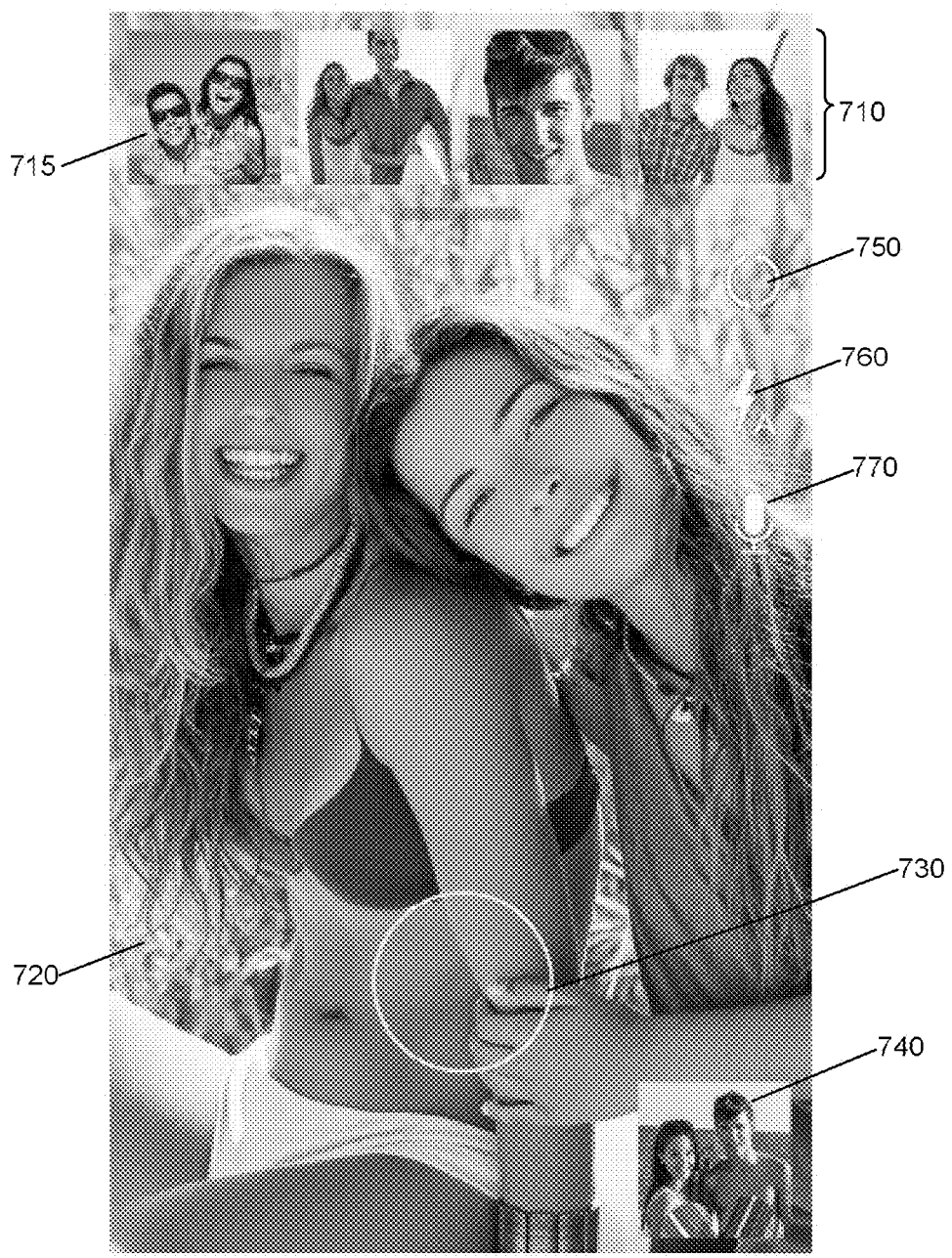
FIG. 7 is a representation of an exemplary CoCreation, or Capture, view 700 within the Reel application, running on a mobile device, displaying normal (permanent) content items.

FIG. 7 demonstrates one of the most exciting features of the Reel service, namely the ability for each user to view and create content items including content captured from other users' live and recorded content. FIG. 7 is a representation of an exemplary CoCreation, or Capture, view 700 within the Reel application, running on a mobile device, displaying normal (permanent) content items. The CoCreation view 700 is the primary interface whereby a user can participate in the forum of users that comprise a Reel, including posting permanent and decayable content items. The CoCreation view 700 includes a main display area 720, which, in this exemplary embodiment, fills substantially the entire screen as a background to various other user interface elements including an album area 710 comprising a set of user-selectable album panes 715 in which recorded content items associated with the reel are displayed, a user-selectable capture control 730 allowing the user (a) to selectively capture content from the main display area and (b) to cause posting of the captured content to the reel as a recorded content item, a user-selectable livebox pane 740 overlaying a portion of the main display area 720, a camera selector 750 allowing the user to switch between forward and backward facing cameras of the mobile device (assuming both types of cameras are present), a flash control 760 allowing the user to control the camera flash setting (e.g., on/off/auto), and a microphone control 770 allowing the user to enable and disable a local microphone of the mobile device as part of a conferencing operation of the Reel application conducted from the CoCreation view 700.

In essence, the album area 710 represents the user's personal local view of the reel. The server infrastructure maintains a "master" copy of the reel (i.e., a copy of all content items associated with the reel and a list of users associated with the reel), but the Reel application in each mobile device maintains a local view of the reel. Each user can delete content items from his or her own local view of the reel, as discussed below, and the Reel application automatically deletes decayable content items from the local view of the reel after the user has viewed the decayable content items, as discussed below. These local deletions do not affect the integrity of the master reel maintained and managed by the server infrastructure. The Reel application in each mobile device synchronizes the local view of the reel with the master reel from time to time (e.g., every N seconds when the Reel application is in communication with the server infrastructure) so that the Reel application can add any new content items to the local view of the reel. Generally speaking, the Reel application maintains local copies of content items associated with the local view of the reel so that the content items can be viewed and manipulated "offline," i.e., even when the Reel application is not in communication with the server infrastructure, such as when there is no wireless service available or when the mobile device is used with the radio off such as in an airplane.

Generally speaking, the capture control 730 allows the user to capture content from whatever is being displayed in the main display area 720. In various alternative modes of operation, the content displayed in the main display area 720 may be video from a camera of the user's mobile device, a live video stream from another user, a one-way video stream from a non-user video source, or, in certain embodiments, an image or video from a recorded content item (e.g., selected from the album area 710). In this exemplary embodiment, using the capture control 730, the user can take a single-frame picture (e.g., by tapping the capture control 730), a video (e.g., by pressing and holding the capture control for an extended period of time), or a multiple frame/scene video (e.g., once the user starts a video, the user can let go and tap+hold again to create a multi-scene video). The captured content item (sometimes referred to herein as a "frame") is posted to the reel as a recorded content item. When the content in the main display area 720 is a live video stream from another user, the capture control 730 will be hidden if such other user has disabled third party capture as discussed below with reference to FIG. 13.

Generally speaking, for a typical capture/conferencing mode of operation, the main display area 720 initially may be filled with a video stream from a selected participant in the Reel while the livebox pane 740 is filled with the user's own camera video stream (either forward or backward facing camera). From this configuration, the user can be conferencing with the other user and can capture from the other user's video stream, while watching the user's own camera video stream in the livebox pane 740. In this exemplary embodiment, when the user selects the livebox pane 740 (e.g., by tapping on it), the contents of the main display area 720 and the livebox pane 740 are swapped, i.e., the main display area 720 is now filled with the user's own camera video stream while the livebox pane 740 is filled with the video stream from the other user. From this configuration, the user can still conference with the user but now can capture from his or her own camera video stream via the main display area 710. If the user again selects the livebox pane 740, a Multiview screen is displayed, as discussed more fully below.

The album panes 715 contain a subset of recorded pictorial content items associated with the Reel (in this exemplary embodiment, four album panes 715 are displayed at a time). The user can scroll horizontally (i.e., sideways) to access additional recorded content items associated with the reel. The content items in the displayed album panes 715 are managed by the server infrastructure and may come from the user and/or from one or more other users. A particular pictorial content item may be a "permanent" content item or a "decayable" content item as specified by the user who posted the content item to the Reel. The pictorial content items in the album panes 715 may be still pictures and/or video. Video content items are displayed with samples from the video running in a loop so that the user can distinguish between recorded content items that are still pictures and recorded content items that are videos. When the user selects an album pane 715, the main display area 720 is filled with the content of the selected album pane 715.

When the user captures content using the capture control 730, the captured content becomes a content item for the Reel. The content item will become available in the album area 710 and also will be sent to the server infrastructure to make it available to other users of the Reel.

In this regard, the user can capture content from a variety of video sources such as a camera of the user's mobile device and in certain embodiments from any of various Internet-connected mobile devices associated with the user's Reel account (e.g. Google Glass, GoPro camera), another user's live video stream shared to the Reel, video provided by other sources (e.g., a video feed from a camera not associated with a user, which may be one-way video), or even from one of the recorded content items in the album area 710.

With regard to video provided by other sources, such sources can include sources such as fixed-location cameras (e.g., a stationary camera located at a venue such as a sporting event or other entertainment venue, a security camera, etc.), portable cameras (e.g., hand-held cameras such as hand-held cameras operated at entertainment venues and by on-location news crews, etc.), mobile cameras (e.g., Skycam, cameras worn by athletes such as a helmet-cam, cameras mounted on vehicles such as racecars, etc.), or virtually any other type of video source that can provide a video stream to the server infrastructure. For example, celebrities (e.g., athletes, entertainers, musicians, fashion divas, etc.) can "publish" a stream of their videos or photos for others to view, capture, and post to their personal reels for sharing with friends (e.g., during fashion week, each designer could publish videos from their fashion shows; entertainers could stream videos of their performances, etc.). Such video streams can be made available to all users or only to a subset of users based on any of a wide variety of criteria. For example, a video stream can be limited to users of a particular Reel or to users at a particular location (e.g., cameras at a particular entertainment venue can be limited to only Reel users who are at the entertainment venue, e.g., via geo-fencing or other location-based determination, thereby providing "value-add" for those Reel users either for free or for a cost). Such video stream could be "one-way" video streams, i.e., allowing other users of the Reel system to view and capture the videos without allowing for conferencing with the source of the video, which may or may not have conferencing capabilities (e.g., a stationary camera generally would not be capable of participating in a conference; a celebrity might be capturing and publishing video/pictures from a device that is capable of conference but may choose not to participate in conferences).

With regard certain embodiments that allow capturing content from a recorded content item, the user may be permitted to play a recorded video item in the main display area 720 by selecting the content item, capture one or more frames of the video using the capture control 730 as discussed above, and post the captured frame(s) as a new content item for the Reel. In this way, the user can take bits and pieces from different content items and make them into separate content items for the reel.

When capturing content from a local camera or capturing live video streaming content of another user who has enabled permanent and decayable third party capture as discussed with reference to FIG. 13 (and, in certain embodiments that allow capturing from recorded content items), the user can choose whether to produce a permanent content item or to produce a decayable content item. By default, capturing content from the CoCreation view 700 via the capture control 730 produces permanent content items. However, the user can choose to produce a decayable content item by double-tapping anywhere in the main display area, which places the capture function into a decay mode.

Figure 8:
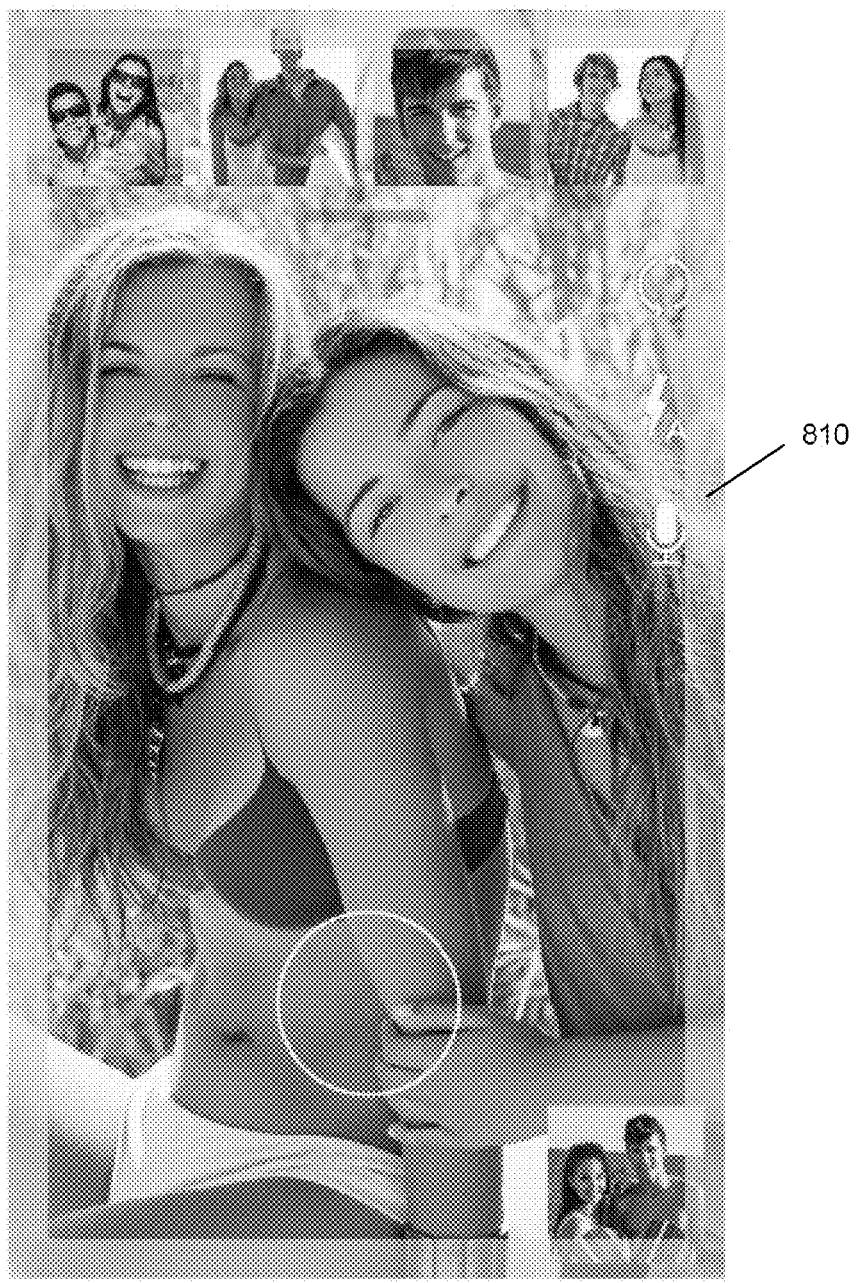
FIG. 8 is a representation of an exemplary CoCreation, or Capture, view 800 within the Reel application, running on a mobile device, when the user is in decay mode.

FIG. 8 is a representation of an exemplary CoCreation, or Capture, view 800 within the Reel application, running on a mobile device, when the user is in decay mode. A pulsing white border 810 appears following this double-tap gesture, indicating to the user that any picture or 15-second continuous video clip or multi-clip video that the user creates via the Capture Button 730 will become a decayable content item that is set to decay in the reel, and thus such decayable content item will be non-sharable and made viewable only once by fellow cocreators of said reel. The user will continue to stay in decay mode (indicated by pulsing borders) until the user double-taps again on the Capture (CoCreation) screen 800.

Figure 9:
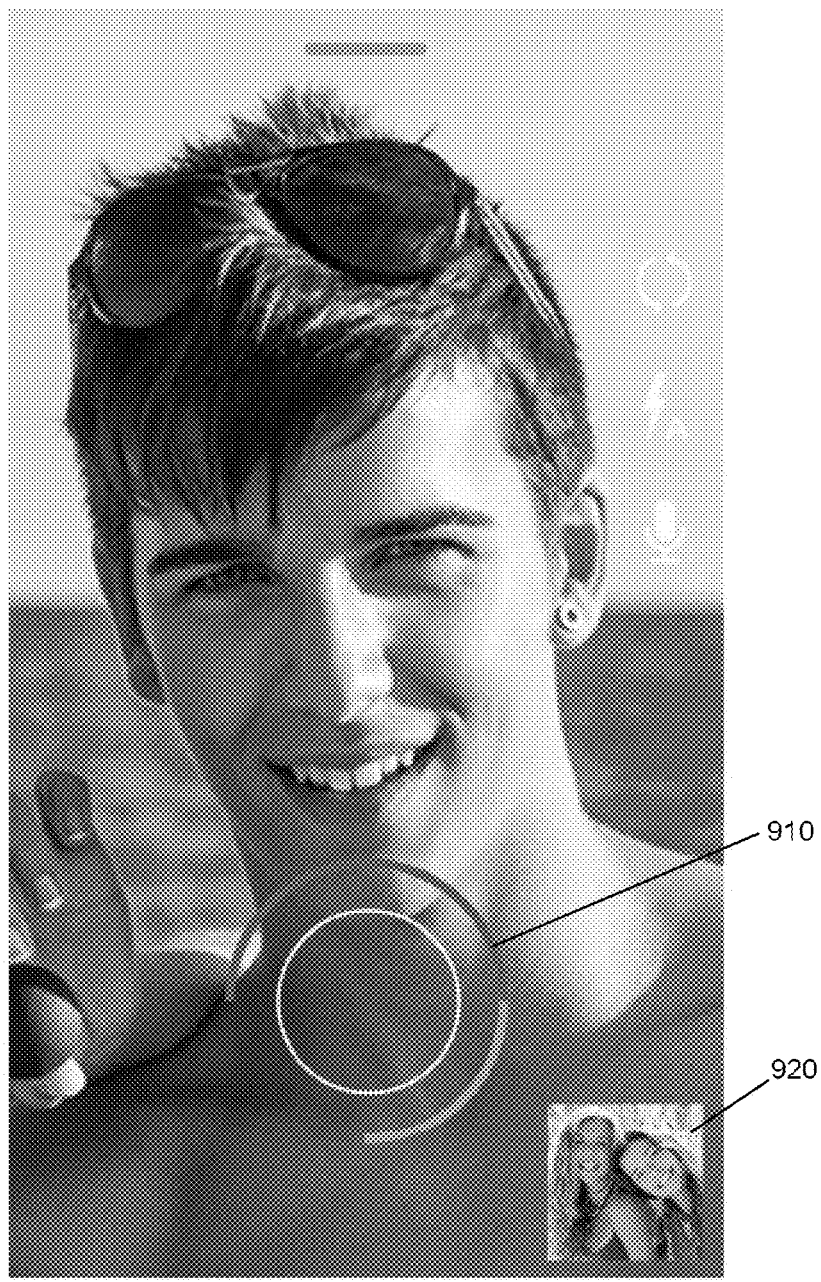
FIG. 9 is a representation of an exemplary CoCreation, or Capture, view 900 within the Reel application, running on a mobile device, displaying a full-screen live video chat with a fellow cocreator.

FIG. 9 is a representation of an exemplary CoCreation, or Capture, view 900 within the Reel application, running on a mobile device, displaying a full-screen live video chat with a fellow cocreator. In this example, from the view 700 in FIG. 7, the user may have tapped on the livebox 740 in order to swap the contents of the main display area 720 and livebox 740 so as to place the live video stream from the livebox 740 (which, in this example, is another cocreator's live-streaming video) into the main display area for capture. In the scenario shown here, the user has decided to collapse (minimize) the reel (i.e., the album area) to the top of the Capture view, so as not to obstruct him or her from seeing the fellow cocreator's live-streaming video.

When another cocreator's live-streaming video (from their mobile device) is displayed in full-screen overlayed by the user's Capture Button, the user is able to capture the three standard types of content (frames): picture (tap motion), continuous video (single hold motion), multi-clip video (hold, release, hold motion).

In the scenario shown here, the user is "third-party capturing" a multi-clip video recording of the fellow cocreator's live-stream, with a progress indictor 910 showing how much video has been captured relative to a predetermined maximum video size (in this exemplary embodiment, captured video frames are limited to a maximum of 15 seconds, although alternative embodiments may allow for different video sizes). FIG. 9 demonstrates the user's simultaneously ability to engage in a live video chat with another cocreator of a reel while the user records a video (or picture) of said live video chat. Simultaneously, the user is also still able to see a preview of what the local camera is live-streaming in the minimized LiveBox (located bottom right).

Figure 10:
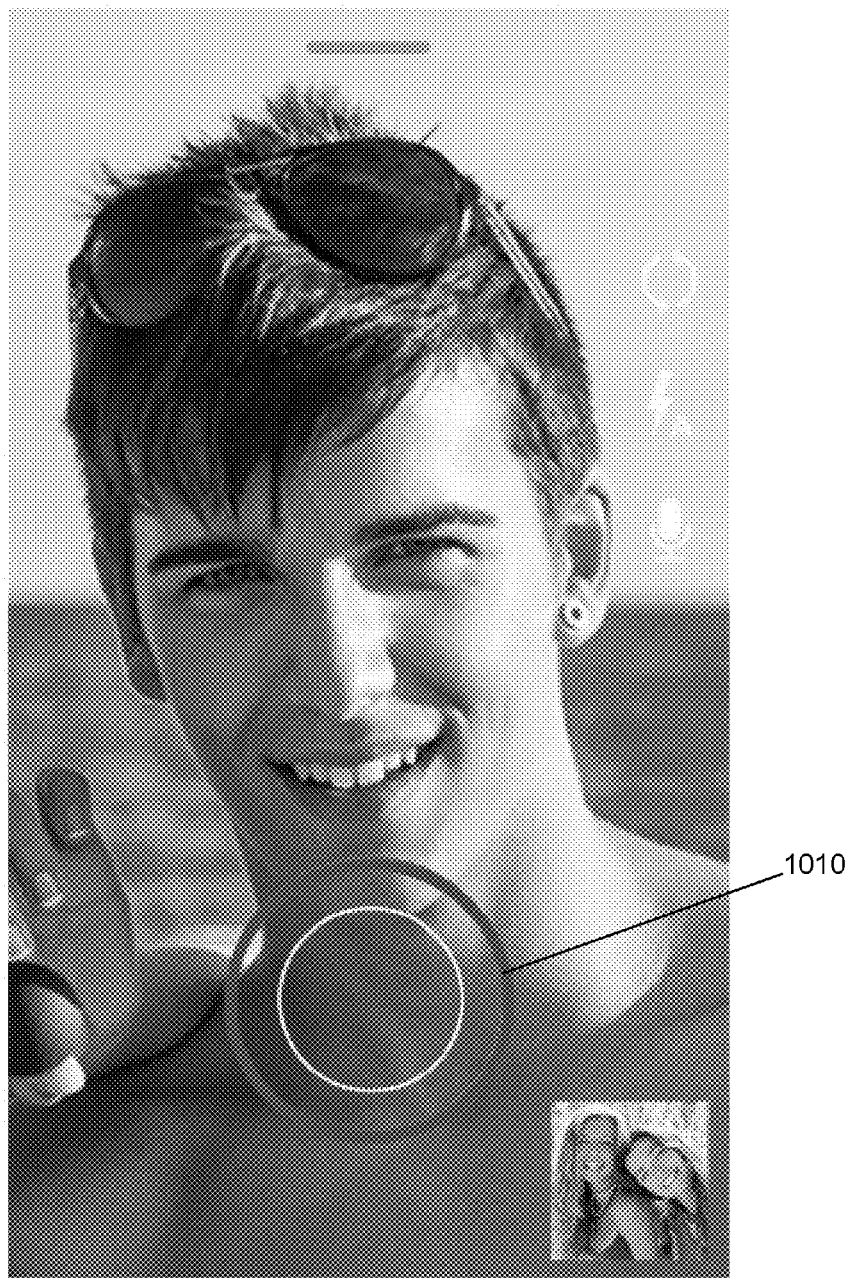
FIG. 10 is a representation of an exemplary CoCreation, or Capture, view 1000 such as it might appear when the capture operation in FIG. 9 is completed, as indicated by the progress indictor 1010.

FIG. 10 is a representation of an exemplary CoCreation, or Capture, view 1000 such as it might appear when the capture operation in FIG. 9 is completed, as indicated by the progress indictor 1010.

Figure 11:
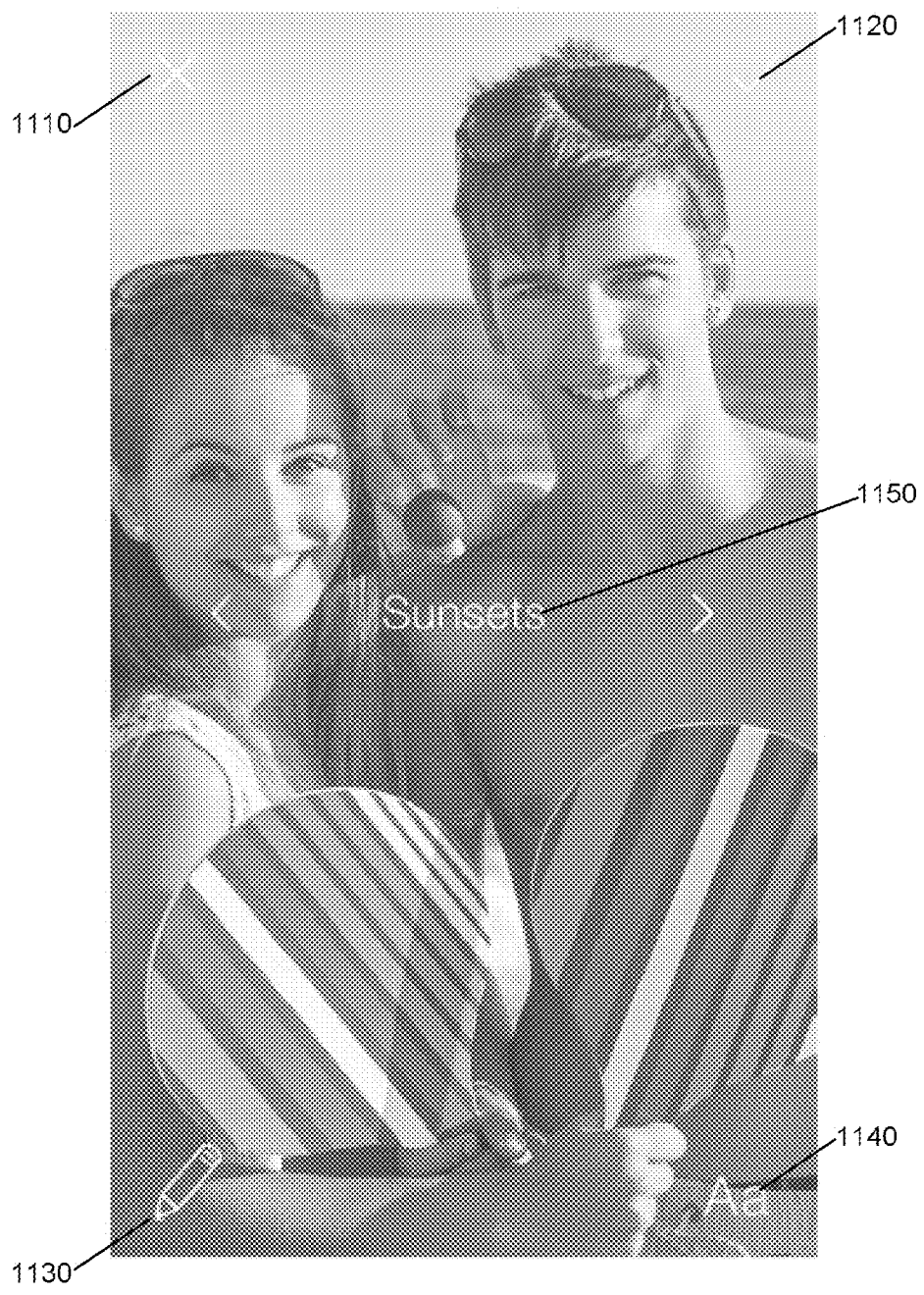
FIG. 11 is a representation of an exemplary Filters view 1100 such as might be shown upon completion of the capture operation in FIG. 10.

FIG. 11 is a representation of an exemplary Filters view 1100 such as might be shown upon completion of the capture operation in FIG. 10. The Filters view acts as a preview and editing screen that appears (every time) after the user creates a picture/video frame using the Capture button but before the picture/video frame gets added to the reel on the Capture (CoCreation) view. After capturing a picture or video, the user can choose to post the frame to the reel as-is or can make certain edits before posting the frame to the reel. For example, the user can apply colored filters (e.g. Black and White, Sepia) to pictures and videos by swiping horizontally. Tapping the Pen icon 1130 allows the user to "doodle" (i.e. draw) on top of said frame in different colors (e.g., by using their finger as a stylus). Tapping the Text icon 1140 allows the user to type a simple text caption (via Reel's standard QWERTY keyboard) that overlays the picture/video frame. In this example, the caption 1150 reading "Sunsets" has been added to the frame. Tapping the checkmark icon 1120 publishes the frame to the reel and returns the user to the Capture (CoCreation) view. Tapping the "X" icon 1110 cancels the frame without posting it to the reel and brings the user back to the Capture (CoCreation) view.

Figure 12:
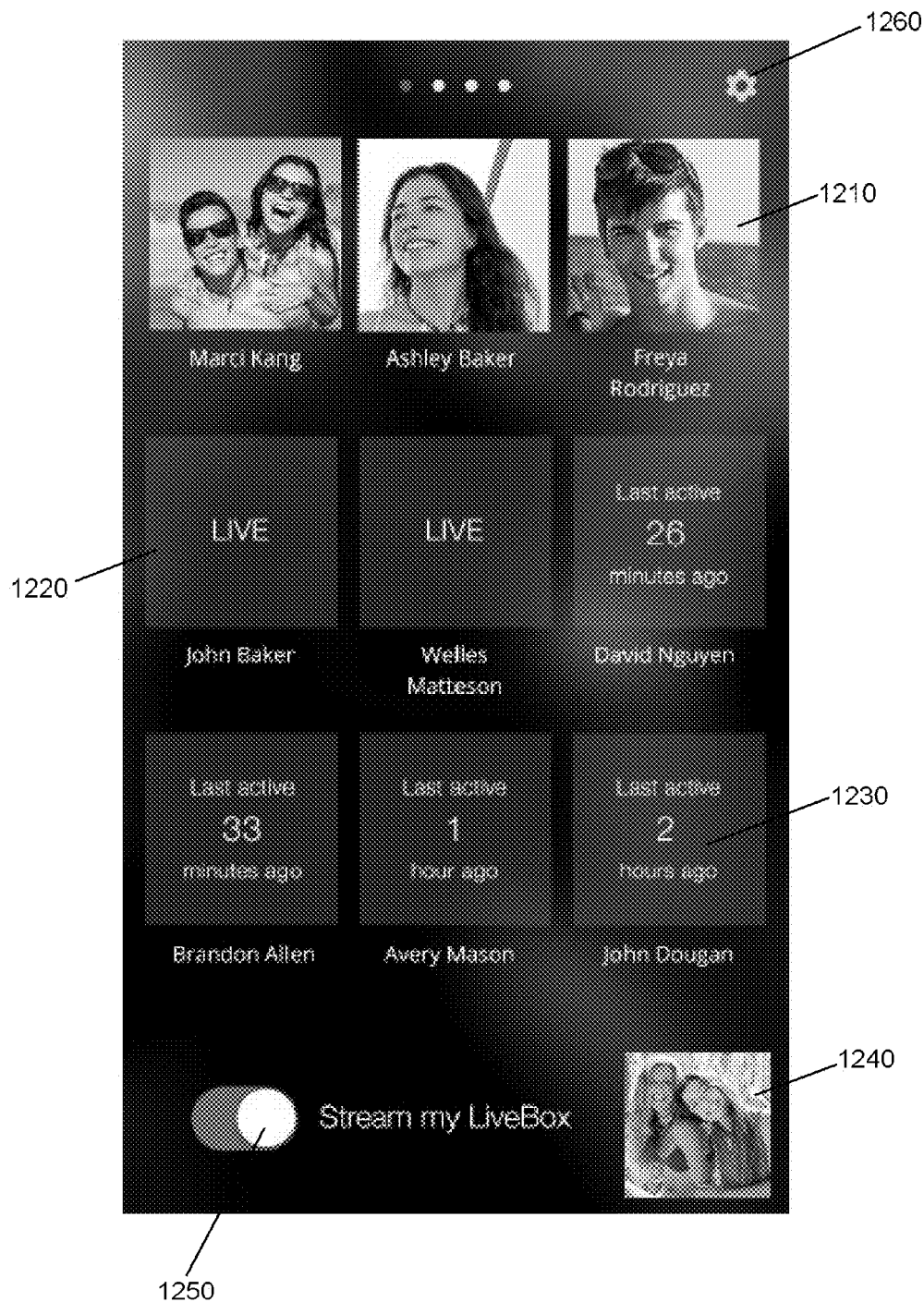
FIG. 12 is a representation of an exemplary Multiview screen 1200 within the application such as might be displayed when the user selects the livebox pane 740 in the CoCreation view 700.

FIG. 12 is a representation of an exemplary Multiview screen 1200 within the application such as might be displayed when the user selects the livebox pane 740 in the CoCreation view 700. The Multiview screen 1200 shows users that are participating in a Reel (in this exemplary embodiment, showing up to nine users at a time), with indication of which users are currently streaming live video from their mobile device (i.e., panes 1210 showing images from the live streaming video, updated in a low-bandwidth manner as discussed below), which users are not streaming but are active (i.e., panes 1220 containing the word "LIVE"), and which users are currently inactive in the given Reel (i.e., panes 1230 showing when the user was last active). In this exemplary embodiment, the Multiview screen 1200 shows users sorted by their status, i.e., currently live users are listed first, users active in the Reel but not stream are listed second, and inactive users are listed third; within each group, users in order of most-recently active. In various alternative embodiments, when the user is actively conferencing with another user, that other user may be identified on the screen 1200 in any of a variety of ways, e.g., by highlighting the pane associated with that other user or by placing the pane associated with that other user in a special location on the screen 1200 (e.g., top left or right corner). The user (whom we shall sometimes call the "initial" user for the sake of clarity) can scroll sideways in order to see additional users. A livebox pane 1240 shows the user's own camera video stream. If the user taps the livebox pane 1240, the Multiview screen is closed and the display returns to the CoCreation view. Tapping on a user that is currently live streaming will close the Multiview screen 1200 and display the selected user's video stream in the CoCreation view, although it should be noted that a conference is not automatically begun between the initial user and the selected user; rather, the selected user would receive a pop-up notification via the server infrastructure indicating that the initial user is viewing the selected user's live video stream (provided the selected user has enable receipt of such messages as discussed with reference to FIG. 13 below), and the selected user can then decide whether to institute a conference with the initial user (e.g., by tapping on the pop-up notification). In the meantime, the initial user can view the selected user's live video stream and can capture from it and post recorded content items from it to the reel. The button 1250 allows the user to enable and disable live streaming video from the user's mobile device to other users via the server infrastructure, where the button view state (color) indicates whether or not the user is streaming. In this exemplary embodiment, even if the user's own camera is not streaming live video to the server infrastructure, the user can view and capture from the user's own camera to create content items for the reel, e.g., from the CoCreation view 700. Tapping on the gear icon 1260 will bring user to a LiveBox Setup screen Settings (FIG. 13).

In the Multiview screen 1200, panes 1210 showing images from other users' live streaming videos are updated at a low rate (e.g., at a low bit rate or every Nth frame) so that the user can monitor each live streaming video without the updating of the content of the pane consuming a great amount of bandwidth at either the mobile device or the server infrastructure. Tapping on a user that is currently live streaming will close the Multiview screen 1200 and display the selected user's video stream in the CoCreation view at full bandwidth. In this exemplary embodiment, low-bandwidth and full-bandwidth versions of a particular video are produced by the server infrastructure and are accessed using different URLs, such that the Reel application in the mobile device is instructed to obtain the low-bandwidth version of the video for display in a pane 1210 from one URL and is instructed to obtain the full-bandwidth version of the video for display in the main display area 720 or livebox 740 from another URL. At any given time, some users of the reel may be receiving the low-bandwidth version of a particular user's video stream while other users of the reel may be receiving the full-bandwidth version of that user's video stream (and still other users of the reel may not be receiving either version of that user's video stream).

Figure 13:
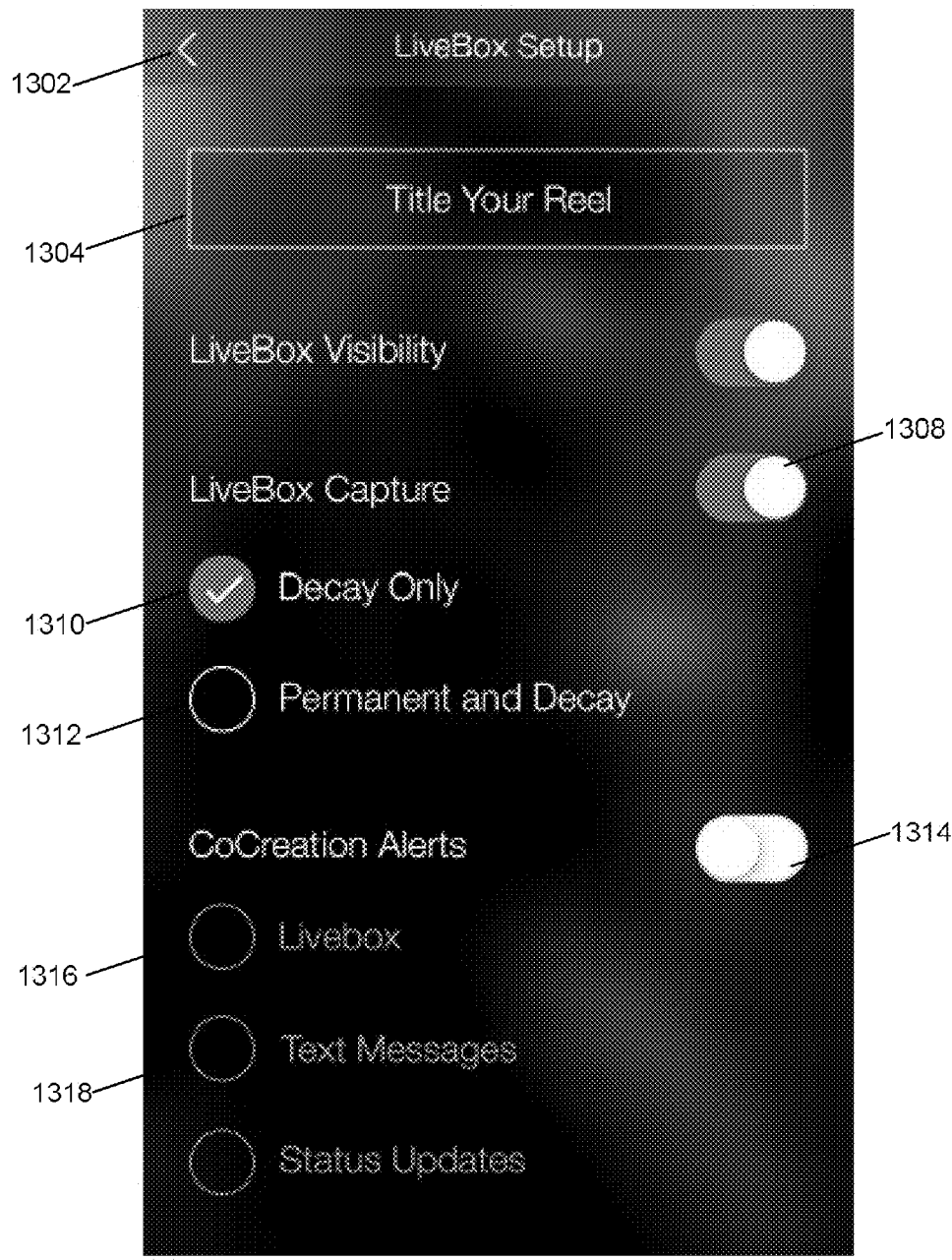
FIG. 13 is a representation of an exemplary LiveBox Setup view 1300 within the application such as might be displayed when the user selects the gear icon 1260 in the Multiview screen 1200.

FIG. 13 is a representation of an exemplary LiveBox Setup view 1300 within the application such as might be displayed when the user selects the gear icon 1260 in the Multiview screen 1200. The LiveBox Setup view 1300 allows the user to configure specific settings for a given Reel. Such settings include altering the title of the Reel, allowing or disallowing 3rd party capture of content items that are contributed to the Reel, which types of content items can be contributed to a Reel (decayable and permanent), and notification preferences for the given Reel. The Back Button 1302 brings user back to Multiview screen 1200. The text field 1304 allows the user to save the title of this Reel. Third Party Capture 1308 toggles whether this user allows for 3rd party capture from his or her live video stream. Radio buttons 1310 and 1312 are used to configure whether the Reel allows for permanent and decayable content items or only decayable items. CoCreation Alerts 1314 toggles whether a user will receive in-app and push notifications (out of app) for this Reel. Toggle buttons 1316 and 1318 allow the user to configure whether LiveBox alerts and/or Chat message alerts will be sent to the user, respectively. A LiveBox alert indicates that another user is viewing the user's live video stream, e.g., when that other user selects the user's pane in the Multiview screen. Chat message alerts are pop-up notifications that occur when the user receives a text message from another user.

Figure 14:
FIG. 14 is a representation of a CoCreation view 1400 with a pop-up text message 1410 written by a fellow cocreator overlaying a portion of the Capture (CoCreation) view within the application.

FIG. 14 is a representation of a CoCreation view 1400 with a pop-up text message 1410 written by a fellow cocreator overlaying a portion of the Capture (CoCreation) view within the application. Text message popups (in real-time) overlay the user's Capture view (either when user's camera display is on or when the user is already engaging in a video chat with another cocreator) and then fade away completely (after 2-5 seconds, depending on the length). If the user taps on the text message, the user is brought to a chat messaging view of the type shown in FIG. 15 showing a text message thread (hidden to the right of the Capture view) to allow for sending and receiving text messages.

Figure 15:
FIG. 15 is a representation of an exemplary chat messaging view 1500 within the application such as might be displayed when the user taps on a pop-up text message such as the pop-up text message 1410 in FIG. 14.

FIG. 15 is a representation of an exemplary chat messaging view 1500 within the application such as might be displayed when the user taps on a pop-up text message such as the pop-up text message 1410 in FIG. 14. The chat messaging view 1500 allows users within a given Reel to send textual messages to other users collaborating in that Reel. Each text message show user's name and time sent. In this exemplary embodiment, the messages are color-coded to differentiate messages quickly. The view 1500 includes a data entry area including a virtual keyboard to allow the user to enter messages and send messages to the forum. It should be noted that in this exemplary view, the text thread overlays the "live" display, which can be either video from the local camera or video from a remote source or even a recorded content item. Conferencing can continue even while the text thread is display and the user sends and receives text messages.

Figure 16:
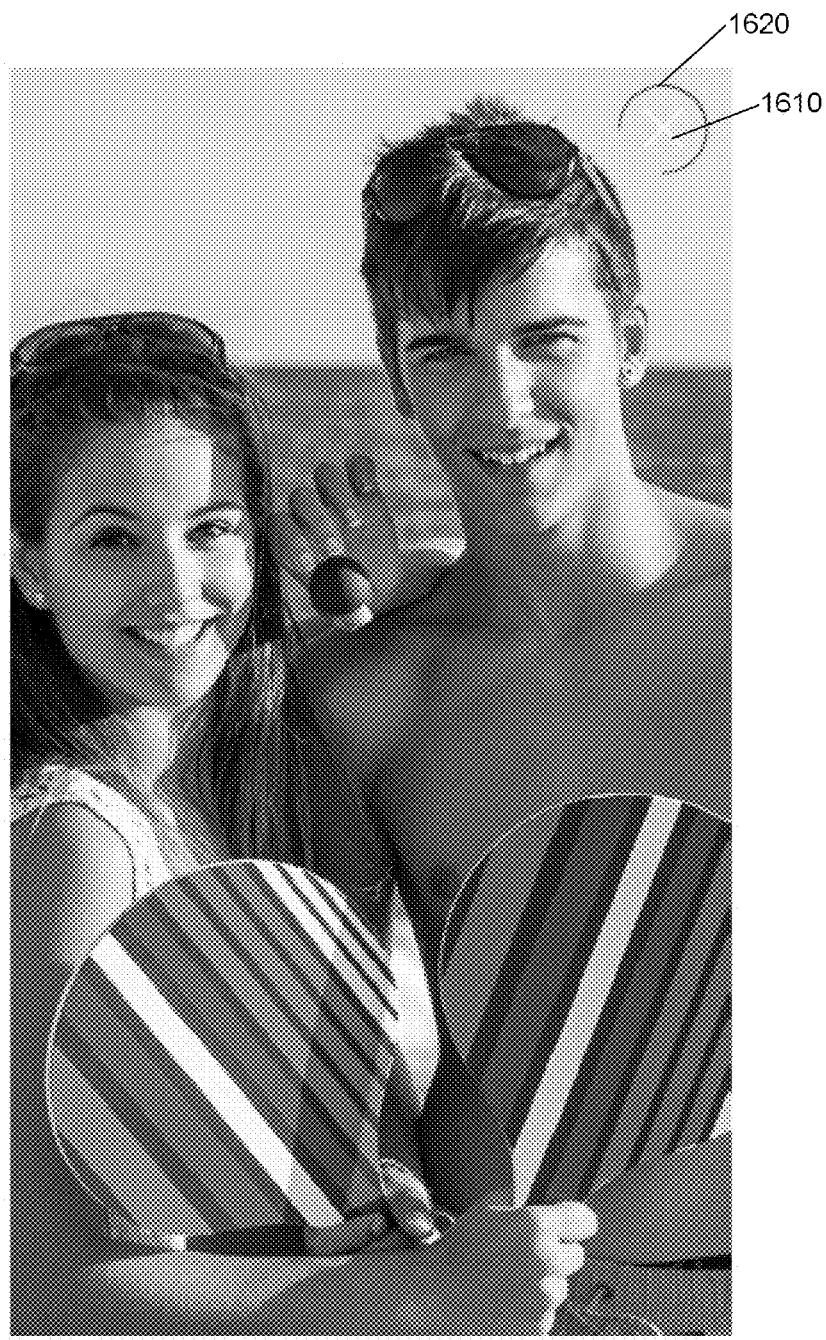
FIG. 16 is a representation of a screen 1600, such as might be displayed upon selection of a decayable content item from the album area 710 of the view 700, in which a selected decayable content item (picture or video) is displayed.

FIG. 16 is a representation of a screen 1600, such as might be displayed upon selection of a decayable content item from the album area 710 of the view 700, in which a selected decayable content item (picture or video) is displayed. In this exemplary embodiment, the decayable content item is displayed with a 10-second decay timer. The time icon 1620 changes size over time to represent the amount of time left before the content item automatically decays and deletes from the display. Upon expiration of the decay timer, the content item is automatically deleted. The delete icon 1610 allows the user to delete the content item before it fully decays. In either case, the decayable content item is removed from the user's reel, i.e., it is deleted locally but remains in the reels of fellow cocreators who have not yet viewed the decayable content item.

Figure 17:
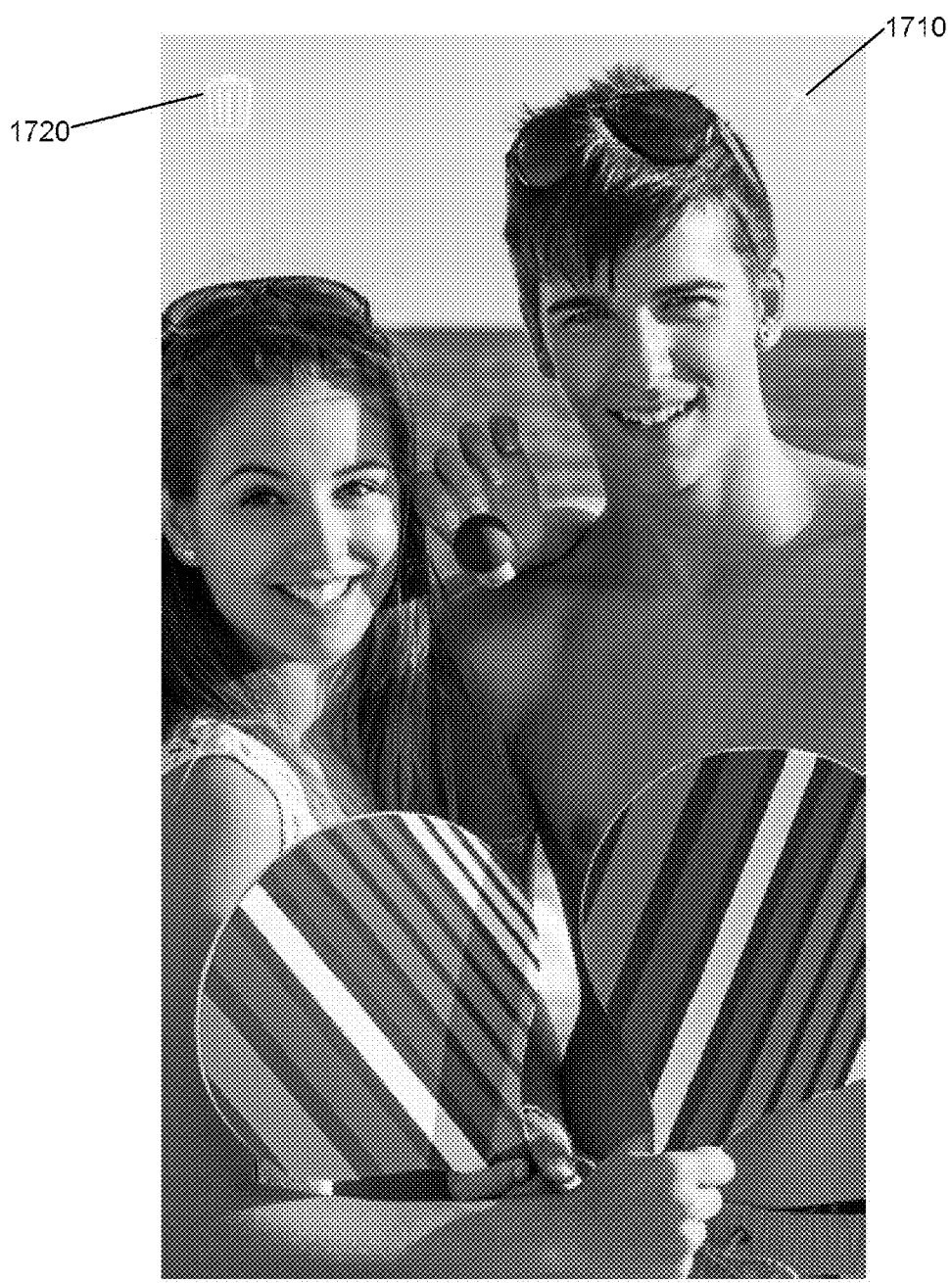
FIG. 17 is a representation of a screen 1700, such as might be displayed upon selection of a permanent content item from the album area 710 of the view 700, in which a selected permanent content item is displayed.

FIG. 17 is a representation of a screen 1700, such as might be displayed upon selection of a permanent content item from the album area 710 of the view 700, in which a selected permanent content item is displayed. It should be noted that in this view, even though the user is viewing a recorded content item and no livebox is displayed, the user can still be conferencing with one or more other users as discussed herein. The close icon 1710 allows the user to close the screen to return to the Capture view screen and the permanent content item will still remain in the reel. The delete icon 1720 allows the user to delete (remove) said permanent content item from the user's reel, i.e., it is deleted locally but remains in the reels of fellow cocreators who have not deleted the content item.

Figure 18:
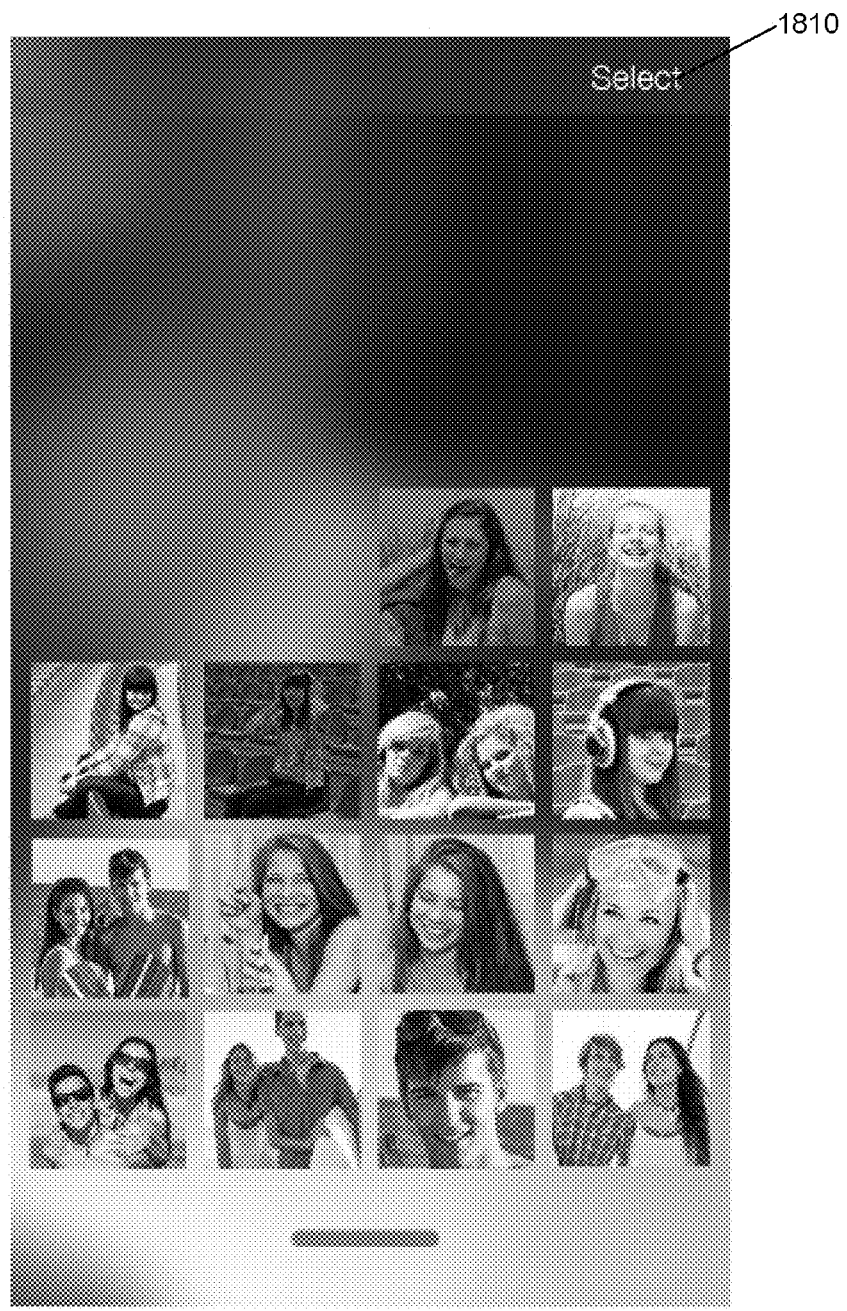
FIG. 18 is a representation of an exemplary Album view 1800 within the application such as might be displayed when the user drags down the album area 710 of the view 700.

FIG. 18 is a representation of an exemplary Album view 1800 within the application such as might be displayed when the user drags down the album area 710 of the view 700. The Album view 1800 shows, for a given Reel, the full collection of content items captured within that Reel. The Album view

1800 shows list of all content items in Reel in order they were added, or a customized order. Tapping and holding on a content item allows the user to move that content item in the overall ordering. Dragging the handle upward will slide the Album view closed. Tapping on any content item will display that content item in full screen. Video clips will loop in full screen. The Select button 1810, when engaged, causes the tap action on each content item to put that item in a selected state, for use in the Delete or Share bulk actions.

Figure 19:
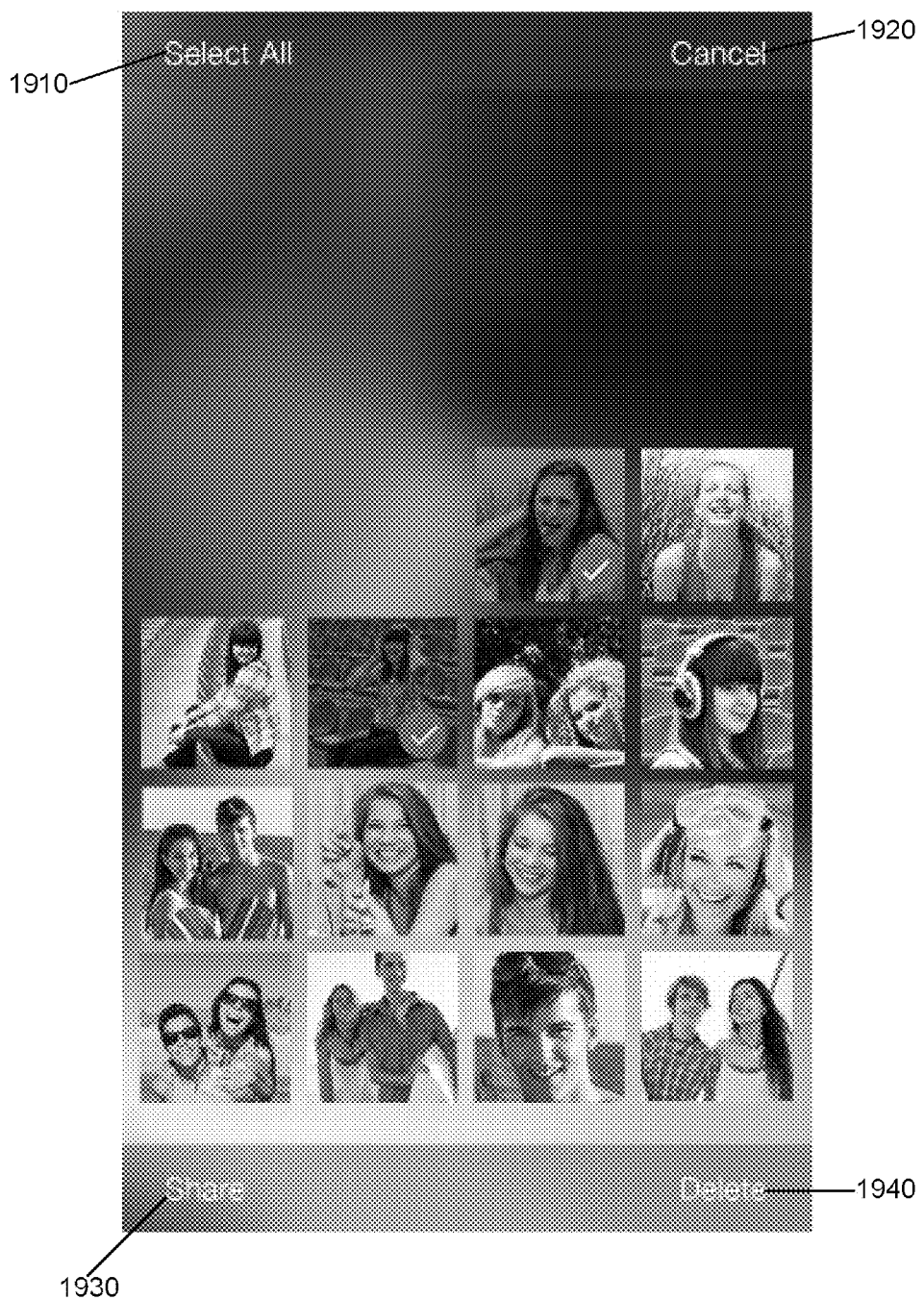
FIG. 19 is a representation of an exemplary Album selection mode view 1900 such as might be displayed when the user taps on the Select button 1810 in the Album view 1800.

FIG. 19 is a representation of an exemplary Album selection mode view 1900 such as might be displayed when the user taps on the Select button 1810 in the Album view 1800. The selection mode allows the user to select specific content items within the Reel for either deletion or social sharing via social networks. Tapping on any content item will give it a "selected" view state (in this exemplary embodiment, a check mark). This allows for selecting multiple content items in the Reel. Tapping Select All 1910 selects all items, unless all items were already selected, in which case this button de-selects all items. With one or more content items selected, tapping Delete 1940 will cause those content items to be deleted. With one or more content items selected, tapping Share 1930 opens default iOS share panel to allow users to share to Twitter, Facebook, Reel. Tapping on Cancel 1920 returns the view to an initial state.

As discussed above, the user can initiate a reel by inviting others to co-create before content has been created for the reel. The user also can initiate a reel after creation of one or more content items. For example, the user can create one or more content items via the capture function and then create a reel and invite others to share the reel.

In the exemplary embodiment discussed above with reference to FIGS. 1-19, the Reel service supports only two-way audio/video conferencing, i.e., between the user and one other user. In various alternative embodiments, multi-way conferencing can be supported in a variety of ways. For example, one way is to allow only two-way video but allow the user to hear audio from two or more other users. Such multi-way audio conference can be user-selectable. For another example, multi-way audio/video conferencing with two or more other users can be supported from a CoCreation screen similar to that of FIG. 7, but where the album panes are replaced with livebox panes associated with other users in the multi-way conference.

It should be noted that a particular user may be a member of multiple reel, and the Reel system keeps the user's operations on the reels separate. For example, if the user is conferencing or texting in a particular reel, then the user's video, audio, text, and other operations are generally restricted to that reel so that users of other reels do not receive such video, audio, and text. However, under certain circumstances, the user will be notified of events that occurred in other reels, such as when new content items are added or someone wants to conference with the user.

FIGS. 20-29 are "wireframe" drawings showing various types of screens/views that are produced by the Reel application running on the mobile device and are used herein to demonstrate aspects of the user experience provided by the Reel application for communication and exchange of content items, in accordance with one exemplary embodiment.

Figure 20:
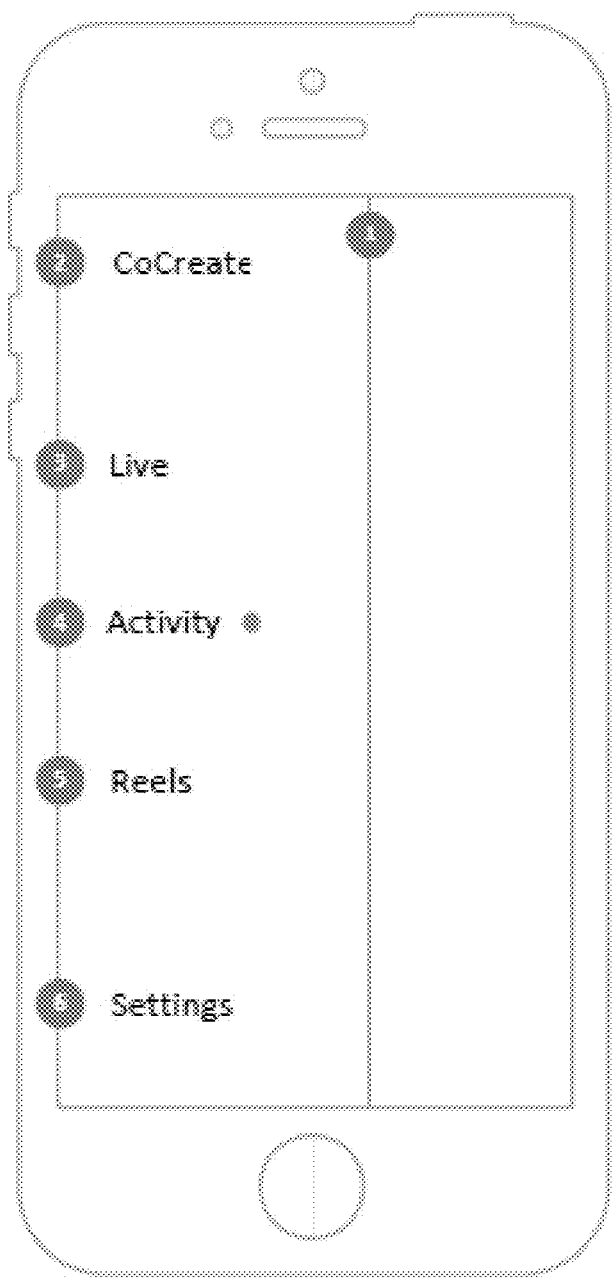
FIG. 20 is a representation of an exemplary main menu used by the application running on a mobile device.

FIG. 20 is a representation of an exemplary main menu used by the application running on a mobile device. The main menu provides navigation through the various functional areas of the application.

1. The Main Menu can be accessed by swiping right from the left edge of the screen. The Main Menu can be closed by dragging the edge of the menu left to the left edge of the screen.

2. User taps on CoCreate menu item to create a new Reel, which brings user to Contacts & Invitation view to specify users to invite to a new Reel.

3. Live menu item brings user to a list of the currently active Reels in which the user is participating.

4. Activity menu item brings user to list of pending invitations to CoCreate in Reels created by other users. A visual indicator (coloured dot) will indicate whether new invitations are pending.

5. Reels menu item brings user to a list of past Reels in which the user participated but are no longer active.

6. Settings menu item brings user to Global Settings view for the Reel application.

Figure 21:
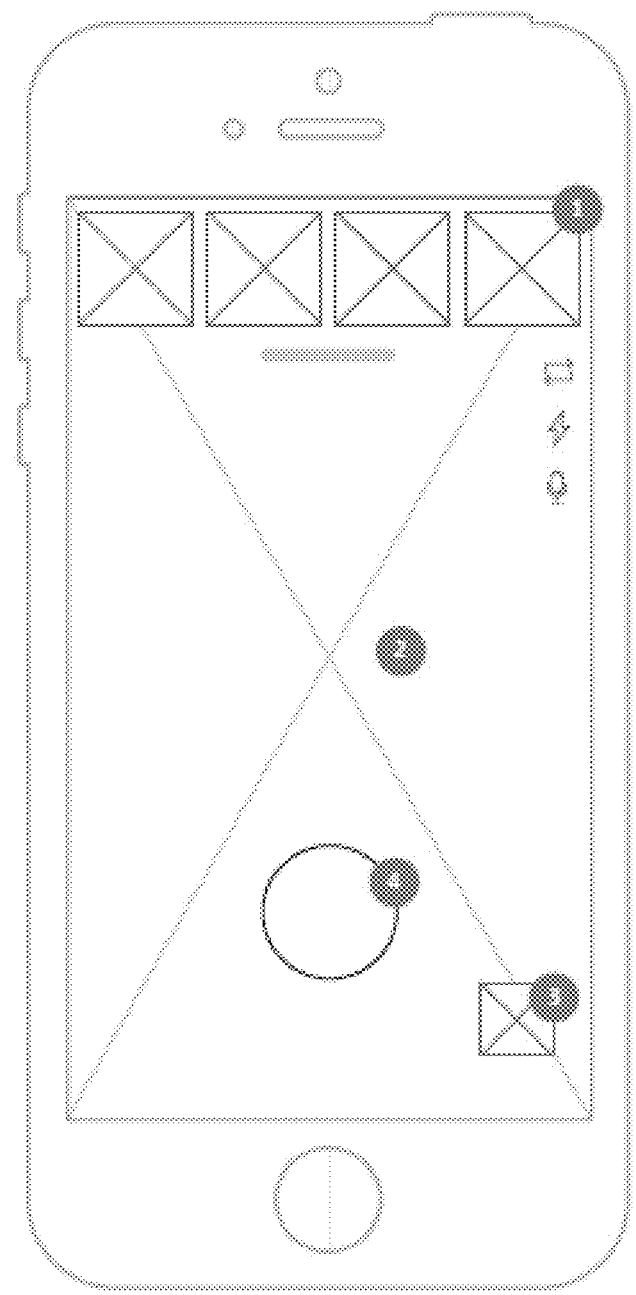
FIG. 21 is a representation of the CoCreation, or Capture, view within the application, running on a mobile device, displaying normal (permanent) content items.

FIG. 21 is a representation of the CoCreation, or Capture, view within the application, running on a mobile device, displaying normal (permanent) content items. The CoCreation view is the primary interface whereby a user can participate in the forum of users that comprise a Reel, including posting permanent and decayable content items.

1. Presents all of the content captured for the Reel. Videos show rotating frames of content.

2. Filling the screen behind other UI elements can be one of the user's own camera video stream (either forward or backward facing camera), or the video stream from the selected participant in the Reel. Video streams from other Reel participants can be selected in the Live Box view (accessed by #3 below).

3. Opens the list of Live Boxes within a Reel. Shown in: Live Box.

4. This button allows a user to take a picture with a tap, or they can hold down to take a video. Once they start a video, the user can let go and tap+hold again to create a multi-scene video.

Figure 22:
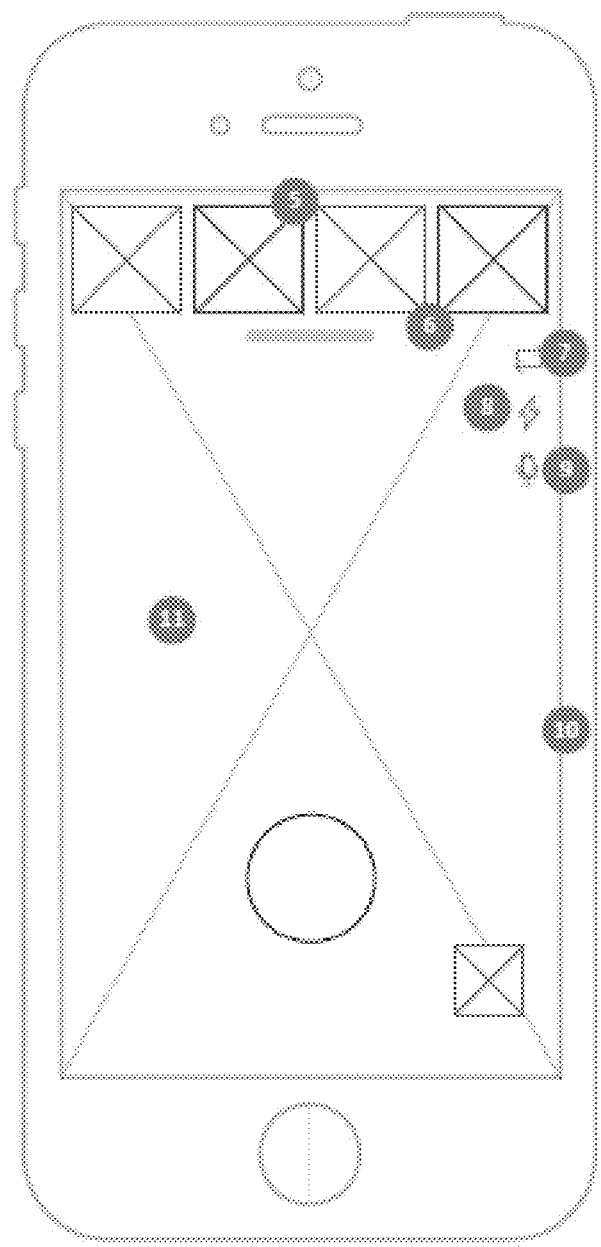
FIG. 22 is a representation of the CoCreation, or Capture, view within the application, displaying decayable content items.

FIG. 22 is a representation of the CoCreation, or Capture, view within the application, displaying decayable content items.

5. Decayable content is displayed within the context of the Reel and is slightly obscured through a visual effect to indicate its decayable status.

6. Sliding down on this allows a user to view all of the content within a Reel. This is shown in the Album View.

7. Changes the phone's camera to forward or backward facing.

8. Toggles the phone's flash from auto, on, or off

9. Toggles the phone's mic to on or off

10. Swiping from the right edge to the left opens the messaging

11. Double tapping the main content display area toggles decayable capture mode. This is indicated by a pulsing white border around the entire screen.

Figure 23:
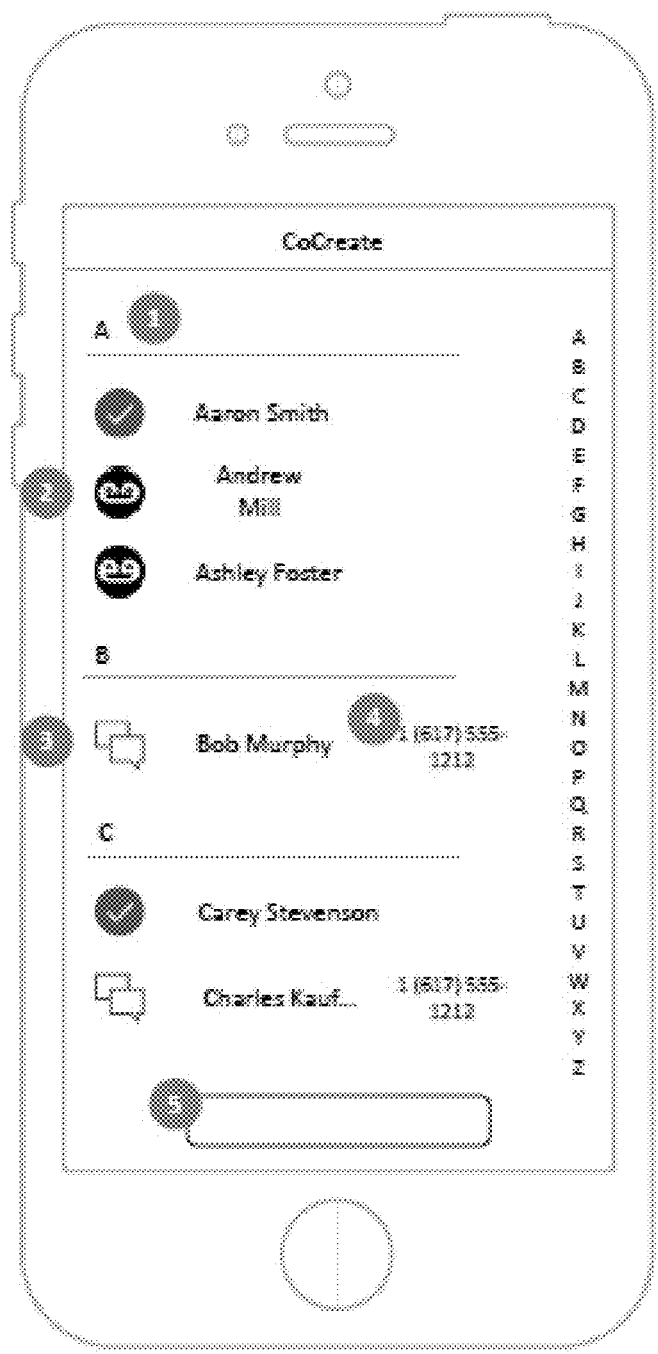
FIG. 23 is a representation of the Contacts & Invitation view within the application, which allows the user to invite both existing users of the application and users not yet registered with Reel to collaborate on a Reel (otherwise known as CoCreating)

FIG. 23 is a representation of the Contacts & Invitation view within the application, which allows the user to invite both existing users of the application and users not yet registered with Reel to collaborate on a Reel (otherwise known as CoCreating).

1. The contact list is grouped by letter of the alphabet (in this case based on first name, but could be based on last name).

2. Contacts in the user's contact list that are already registered for Reel (with their mobile phone number) are indicated as existing members with the Reel e's icon. The Reel icon can be tapped to select that user for invitation to CoCreate in the Reel.

3. Contacts in the user's contact list that are not yet registered for Reel are displayed with an icon indicated that they will be invited via SMS text message. The SMS icon can be tapped to select that user for invitation to CoCreate in the Reel.

4. For users that will be invited via SMS text message, the automatically selected mobile phone number from the user's contact list will be displayed. Tapping on that phone number will yield a selector to choose the appropriate phone number to send the SMS invitation message.

5. If one or more contacts is selected, a button will display at the bottom of the screen which confirms the selection and invites the selected users.

Figure 24:
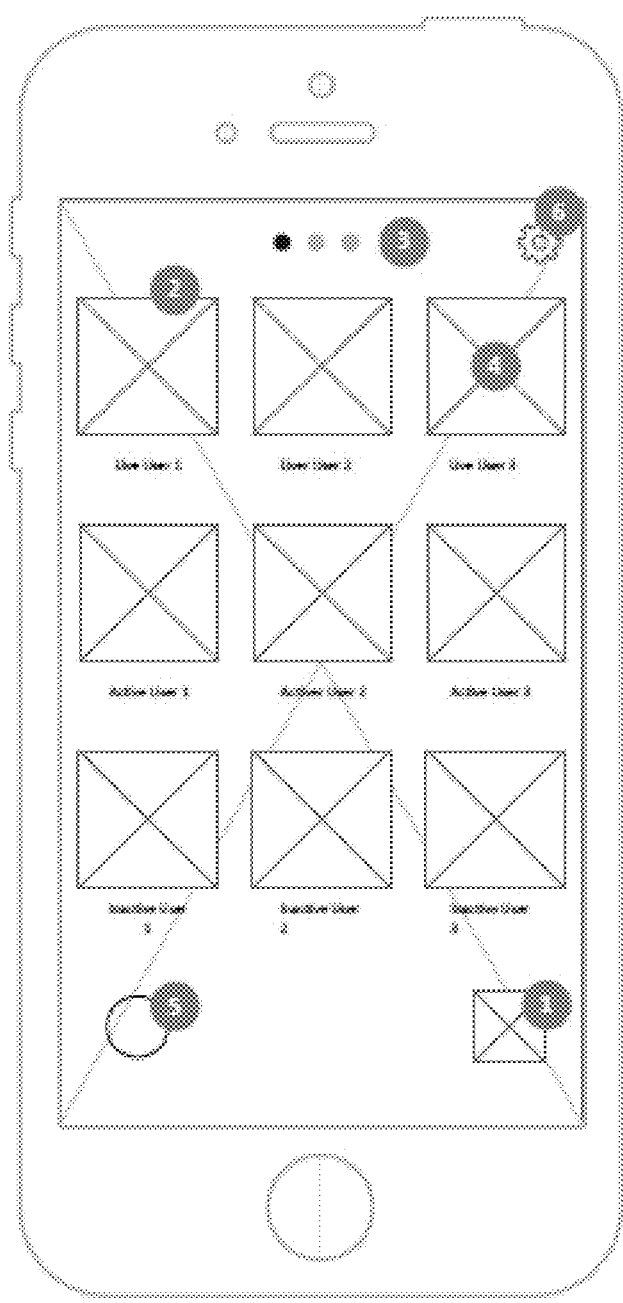
FIG. 24 is a representation of the Live Box "MultiView" within the application, which shows all users that are participating in a Reel, with indication of which users are currently streaming live video from their mobile device, which are not streaming but are active, and which are currently inactive in the given Reel.

FIG. 24 is a representation of the Live Box "MultiView" within the application, which shows all users that are participating in a Reel, with indication of which users are currently streaming live video from their mobile device, which are not streaming but are active, and which are currently inactive in the given Reel.

1. Shows the user. When tapped, closes the Live Box view.

2. LiveBox view shows users sorted by their status:
Users currently live streaming are listed first
Users active in the Reel (but not streaming) are listed second
Users that are not active in the Reel are listed third
Within each group users are in order of most recently active 3. The full list of users in the Reel scrolls page by page (3×3 grid) horizontally.

4. Tapping on a user that is currently live streaming will close the LiveBox view and display the selected user's video stream in the CoCreation view.

5. Toggle button to control whether the user is sending a live stream from their device's camera. Button view state (color) indicates whether user is streaming or not.

6. Tapping on the gear icon will bring user to Reel Settings to control LiveBox and alert settings.

Figure 25:
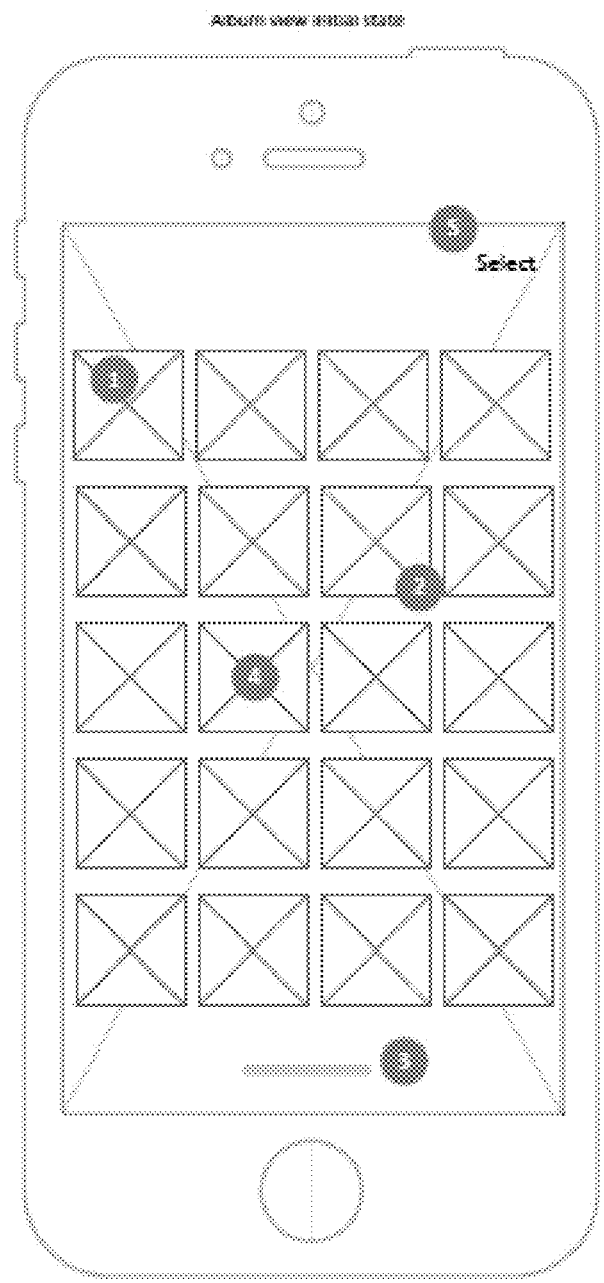
FIG. 25 is a representation of the Album view within the application which, for a given Reel, shows the full collection of content items captured within that Reel.

FIG. 25 is a representation of the Album view within the application which, for a given Reel, shows the full collection of content items captured within that Reel.

1. Album view shows list of all content items in Reel in order they were added, or a customized order.

2. Tapping and holding on a content item allows the user to move that content item in the overall ordering.

3. Dragging the handle upward will slide the Album view closed.

4. Tapping on any content item will display that content item in full screen. Video clips will loop in full screen.

5. The Select button, when engaged, causes the tap action on each content item to put that item in a selected state, for use in the Delete or Share bulk actions.

Figure 26:
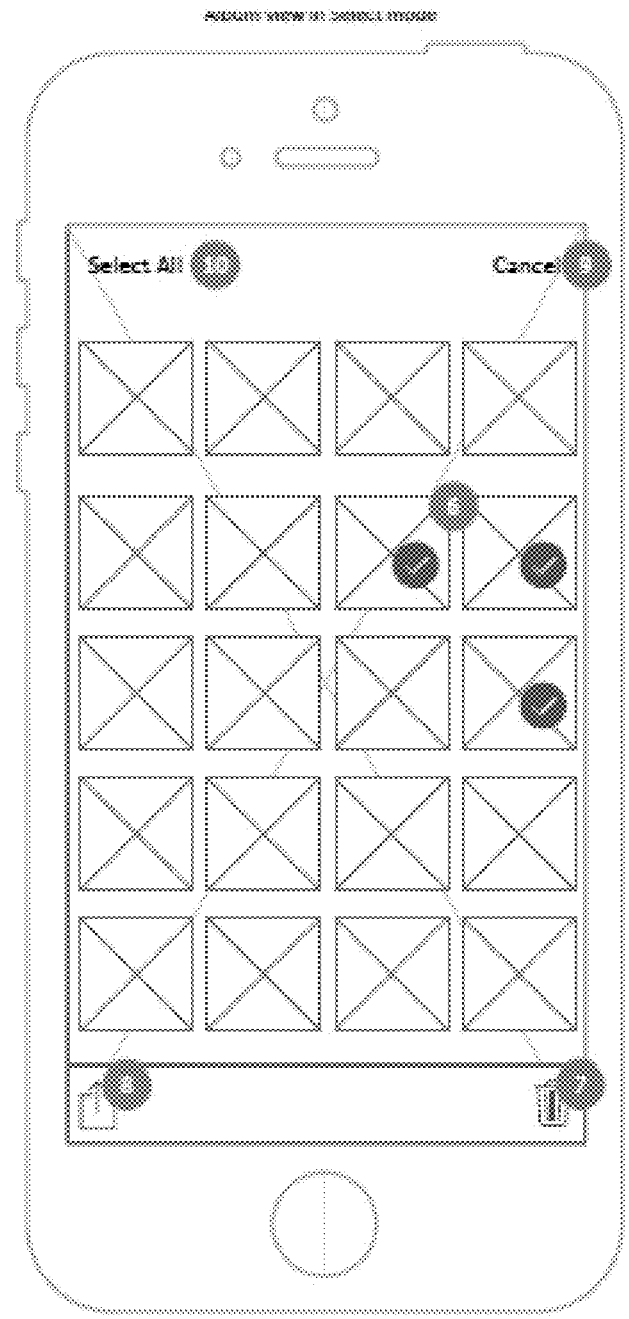
FIG. 26 is a representation of the Album view when in selection mode. This mode allows the user to select specific content items within the Reel for either deletion or social sharing via social networks.

FIG. 26 is a representation of the Album view when in selection mode. This mode allows the user to select specific content items within the Reel for either deletion or social sharing via social networks.

6. After Select is tapped, tapping on any content item will give it a "selected" view state (check mark). This allows for selecting multiple content items in the Reel.

7. With one or more content items selected, tapping Delete will cause those content items to be deleted.

8. With one or more content items selected, tapping Share opens default iOS share panel to allow users to share to Twitter, Facebook, Reel.

9. Returns view to initial state.

10. Selects all items. Changes to de-select all if all are selected.

Figure 27:
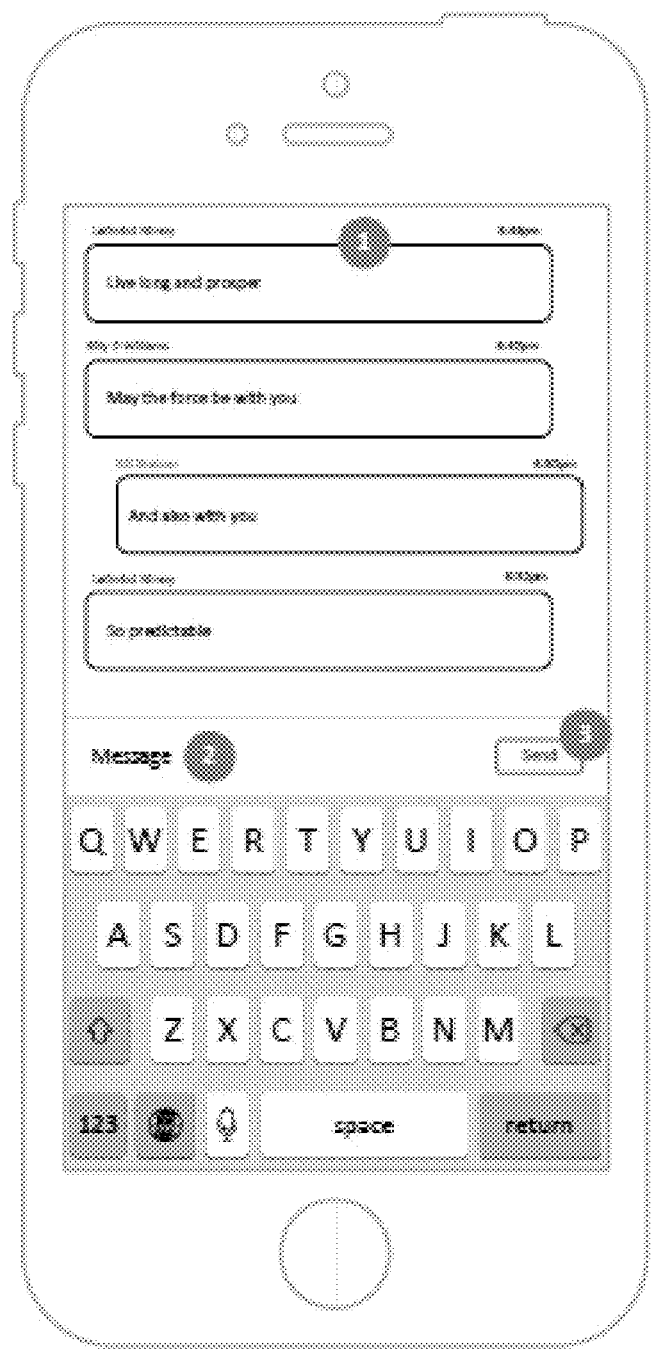
FIG. 27 is a representation of the chat messaging view within the application, which allows users within a given Reel to send textual messages to other users collaborating in that Reel.

FIG. 27 is a representation of the chat messaging view within the application, which allows users within a given Reel to send textual messages to other users collaborating in that Reel.

1. Each text message show user's name and time sent. This should be color coded to differentiate messages quickly.

2. Box to enter messages

3. Send message to group

Figure 28:
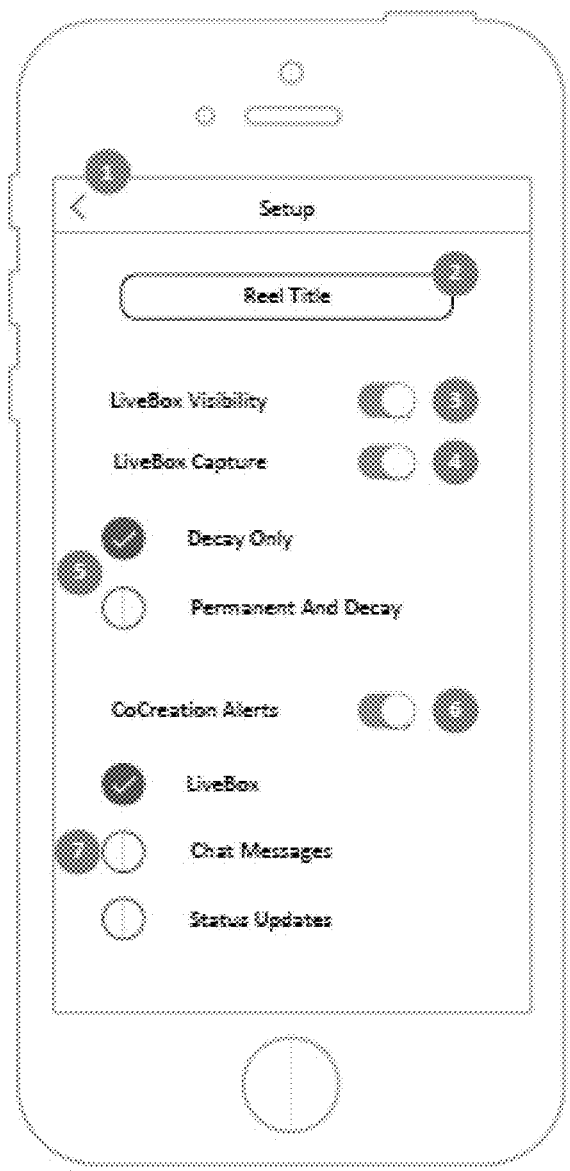
FIG. 28 is a representation of a view within the application that allows the user to configure specific settings for a given Reel.

FIG. 28 is a representation of a view within the application that allows the user to configure specific settings for a given Reel. Such settings include altering the title of the Reel, allowing or disallowing other Reel users to see the given user as active within the application, allowing or disallowing 3rd party capture of content items that are contributed to the Reel, which types of content items can be contributed to a Reel (decayable and permanent), and notification preferences for the given Reel.

1. The Back Button brings user back to LiveBox Multi-View.

2. Text field allows user to save the title of this Reel.

3. LiveBox visibility toggles whether a user is live broadcasting in this Reel.

4. LiveBox Capture toggles whether this Reel allows for 3rd party capture.

5. Radio button indicates whether Reel allows for permanent and decayable content items or only decayable items.

6. CoCreation Alerts toggles whether a user will receive in-app and push notifications (out of app) for this Reel.

7. Toggle buttons indicate whether LiveBox alerts, Chat message alerts, and status update alerts will be sent to the user.

Figure 29:
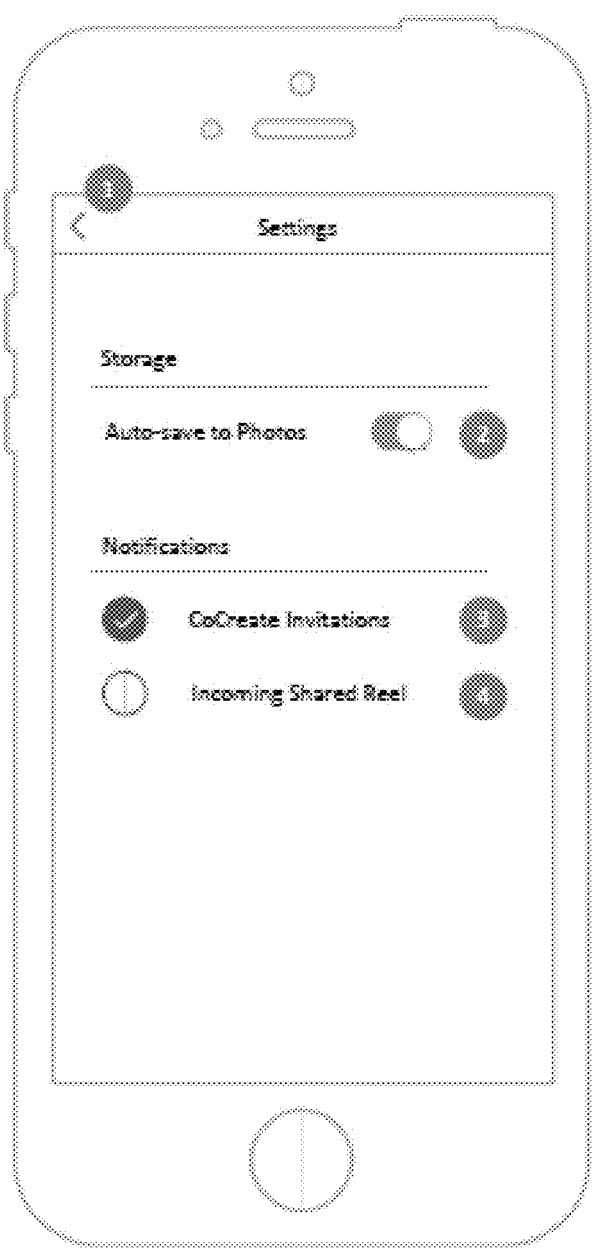
FIG. 29 is a representation of a view within the application that allows the user to configure general settings for the application.

FIG. 29 is a representation of a view within the application that allows the user to configure general settings for the application. Such settings include whether content items contributed to Reels are also automatically exported to the mobile device's local collection of photos and videos, and general notification preferences.

1. The Back Button brings user back to the CoCreation (Capture) view.

2. Auto-save to Photos toggles whether captured images and video clips will but automatically exported to the device's built-in photo album.

3. CoCreate Invitations toggles whether user will receive in-app and push notifications (out of app) for invitations to new Reels by other users.

4. Incoming Shared Reel toggles whether user will receive in-app and push notifications (out of app) for Reels that have been shared with the user.

Figure 30:
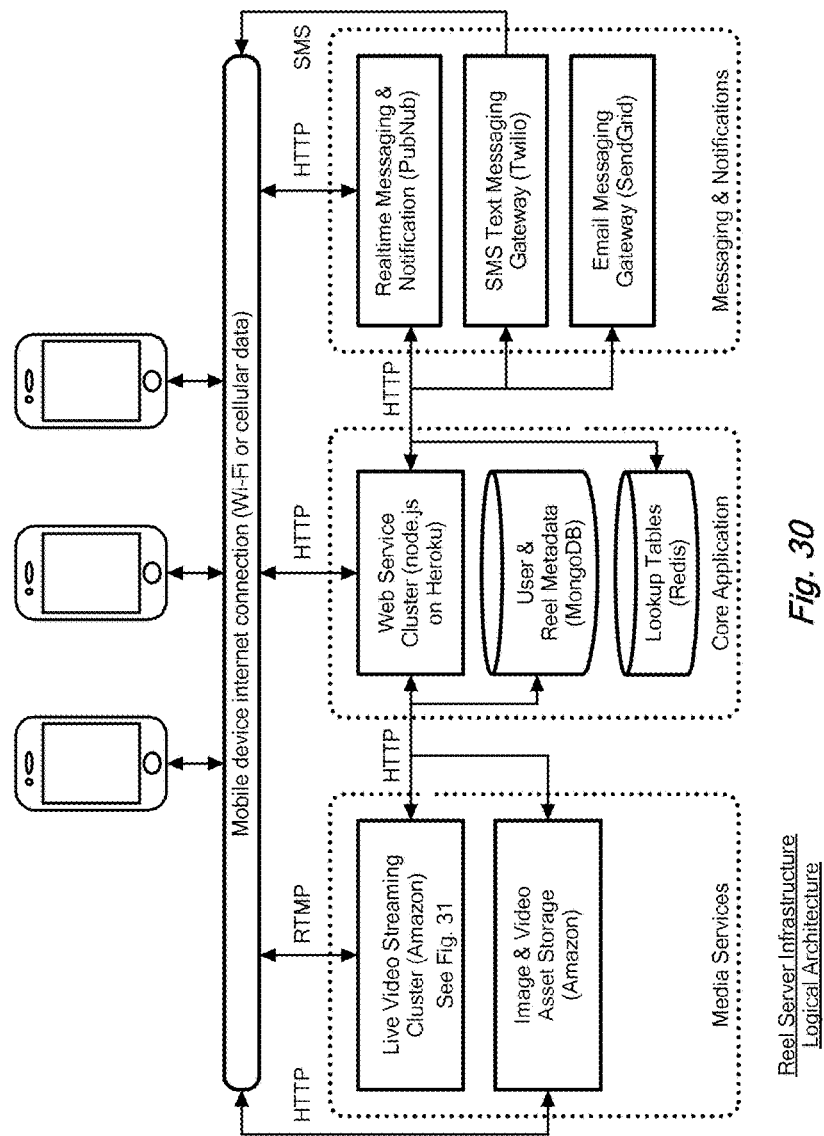
FIG. 30 is a representation of the logical system architecture for the overall server infrastructure.

FIG. 30 is a representation of the logical system architecture for the overall server infrastructure. In this figure the following server infrastructure components are shown:

User mobile device: the mobile device used by the user (for example, an iPhone).

Mobile device internet connection: the network connection used by the user's mobile device, which can be either a Wi-Fi wireless network or the device's mobile data connection, using technologies such as 3G, 4G, and LTE.

Web Service Cluster: an application hosted on a cluster of web servers which manages the business logic for the entire system and also provides access to metadata for users of the application as well as metadata regarding the forum of users participating in a Reel, and any Live Box live video streams. This is currently implemented as a node.js application cluster hosted in the Heroku web hosting service.

User & Reel Metadata: a data repository which serves as the system of record for any metadata being used for the application. This is currently implemented as a MongoDB cluster hosted in the MongoLab data hosting service.

Live Video Streaming Cluster: a server infrastructure which implements live video streaming between users of the application. It collaborates with the Web Service Cluster to coordinate what streams are needed between users of the application. See FIG. 31 for full details on this component.

Image & Video Asset Storage: a data repository which stores the image and (non-live) video asset files which comprise the content items within a Reel. This is currently implemented using Amazon's Simple Storage Service.

Realtime Messaging & Notification: a web-based server infrastructure which provides near realtime messaging and event notifications between participating infrastructure components and mobile devices. This is currently implemented using the PubNub messaging and event service.

SMS Text Messaging Gateway: a web-based server infrastructure which allows for sending SMS (short message service) or text messages to SMS-capable mobile devices. This is currently implemented using the Twilio hosted SMS gateway service.

Email Messaging Gateway: a web-based server infrastructure which allows for sending email messages. This is currently implemented using the SendGrid hosted email gateway service.

Figure 31:
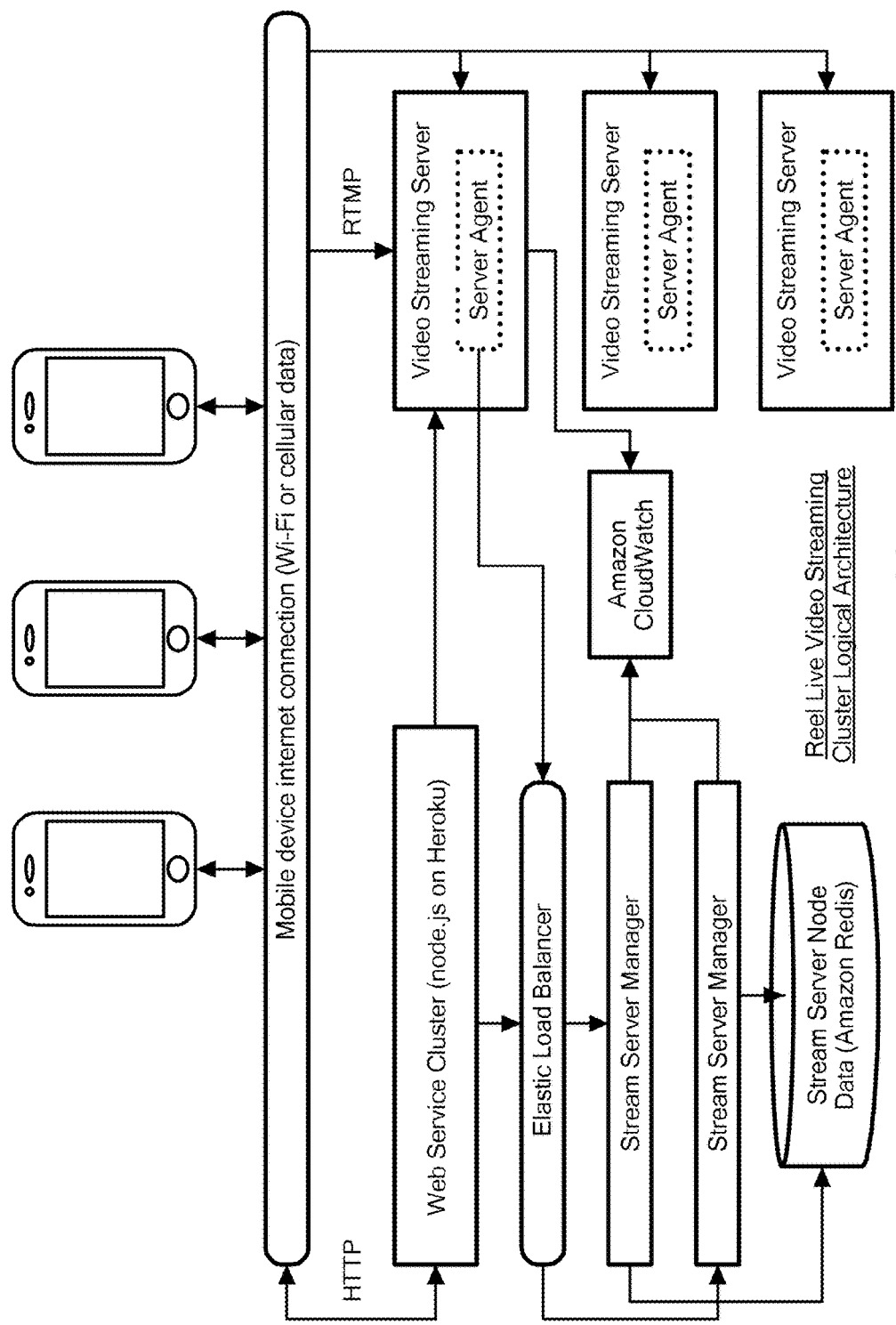
FIG. 31 is a representation of the logical system architecture for the live video streaming server infrastructure.

FIG. 31 is a representation of the logical system architecture for the live video streaming server infrastructure. In this figure the following server infrastructure components are shown:

User mobile device: the mobile device used by the user (for example, an iPhone).

Mobile device internet connection: the network connection used by the user's mobile device, which can be either a Wi-Fi wireless network or the device's mobile data connection, using technologies such as 3G, 4G, and LTE.

Elastic Load Balancer: a load balancer networking component which provides a single connection endpoint over a network, which then distributes requests across 2 or more Stream Server Manager components. This is currently implemented using Amazon's Elastic Load Balancer service.

Stream Server Manager: a cluster of web service applications which implement business rules around how to distribute video streams across the cluster of Video Streaming Servers, as well as maintains metadata regarding the utilization of resources on each of the Video Streaming Servers. This is currently implemented as a node.js application cluster hosted in Amazon's Elastic Compute Cloud web hosting service.

Stream Server Node Data: a data repository containing metadata regarding all the Video Streaming Servers currently in the infrastructure. This is currently implemented using Redis in Amazon's ElastiCache service.

Video Streaming Server: a cluster of live video streaming servers that manages routing video streams between users of the application. This is currently implemented using the EvoStream video streaming software hosted on the Amazon Elastic Compute Cloud service. Each Video Streaming Server has a Server Agent running which communicates information about the server back to the Stream Server Manager cluster and Amazon CloudWatch. This is implemented as a local node.js web service application.

Amazon CloudWatch: Amazon's service for monitoring operational and performance metrics for servers hosted in Amazon's web services. This is used to track resource utilization on each of the Video Streaming Servers.

Web Service Cluster: this is the same component from FIG. 30, however it is displayed here to illustrate that there is collaboration between the user's mobile device, the Stream Server Managers, and the Video Streaming Servers to coordinate what video streams are needed between users of the application.

Figure 32:
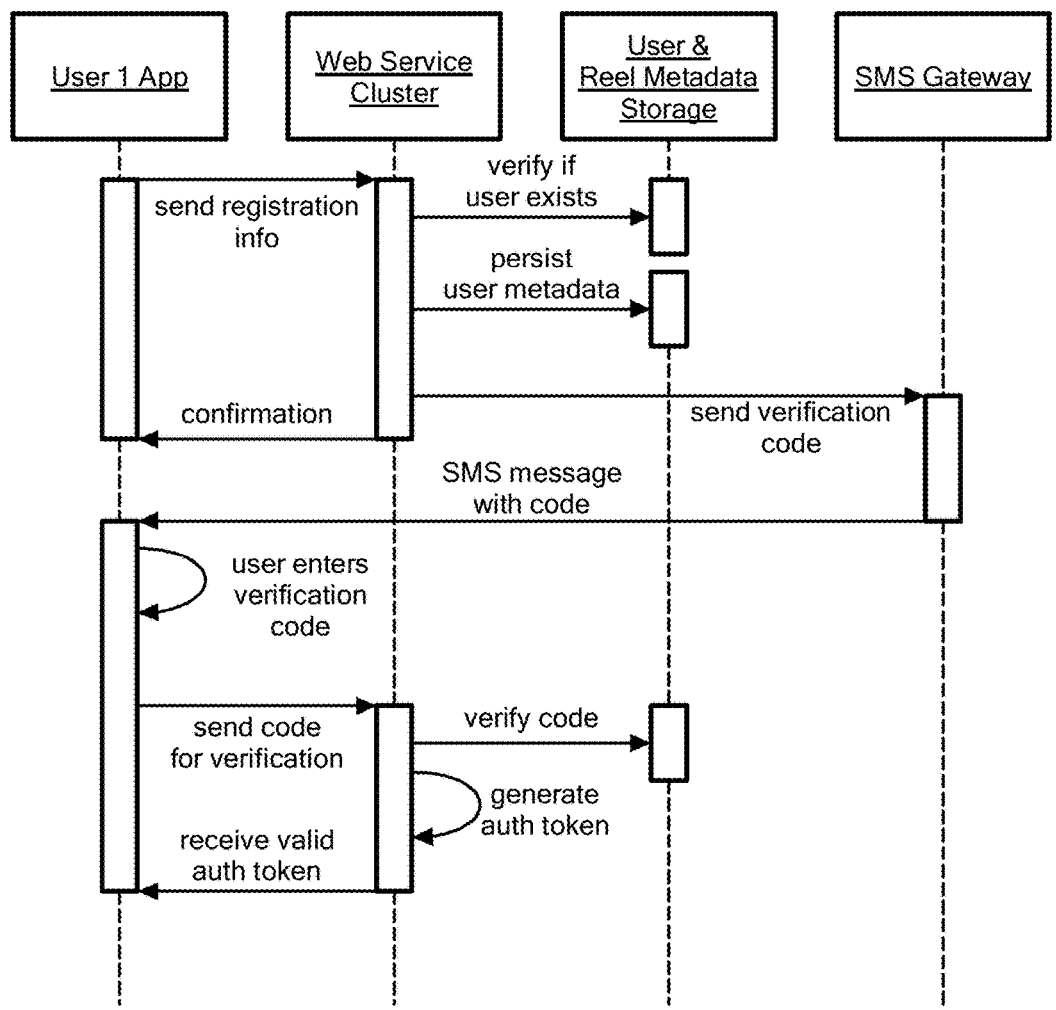
FIG. 32 is a representation of the interactions that take place between the application and several components of the server infrastructure which occur when a user first registers their mobile device with the application (i.e., a new sign up)

FIG. 32 is a representation of the interactions that take place between the application and several components of the server infrastructure which occur when a user first registers their mobile device with the application (i.e., a new sign up).

Figure 33:
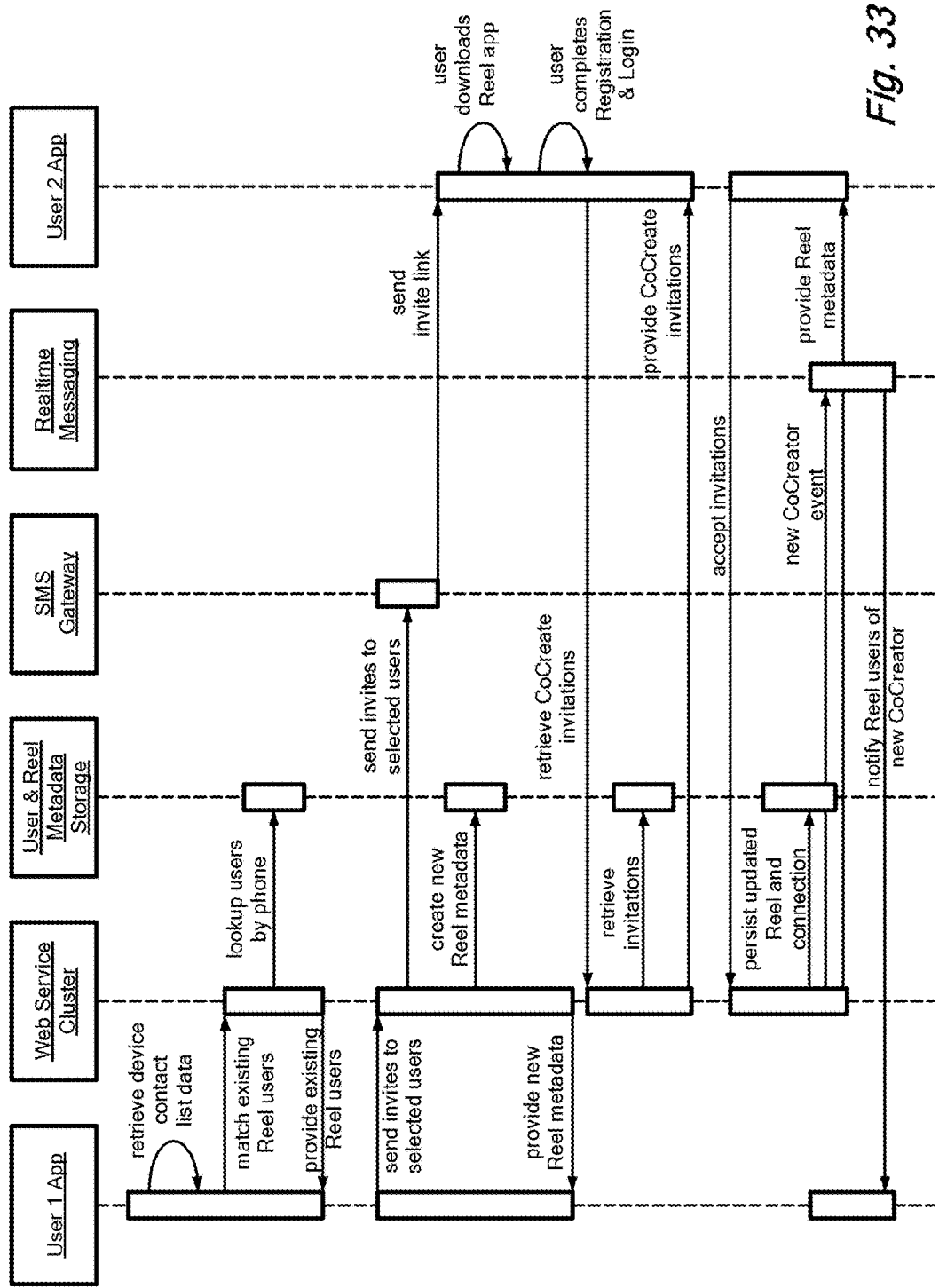
FIG. 33 is a representation of the interactions that take place between the application and several components of the server infrastructure which occur when a user invites a second user to register with the Reel application with the intent to collaborate within a specific Reel (also known as CoCreation)

FIG. 33 is a representation of the interactions that take place between the application and several components of the server infrastructure which occur when a user invites a second user to register with the Reel application with the intent to collaborate within a specific Reel (also known as CoCreation).

Figure 34:
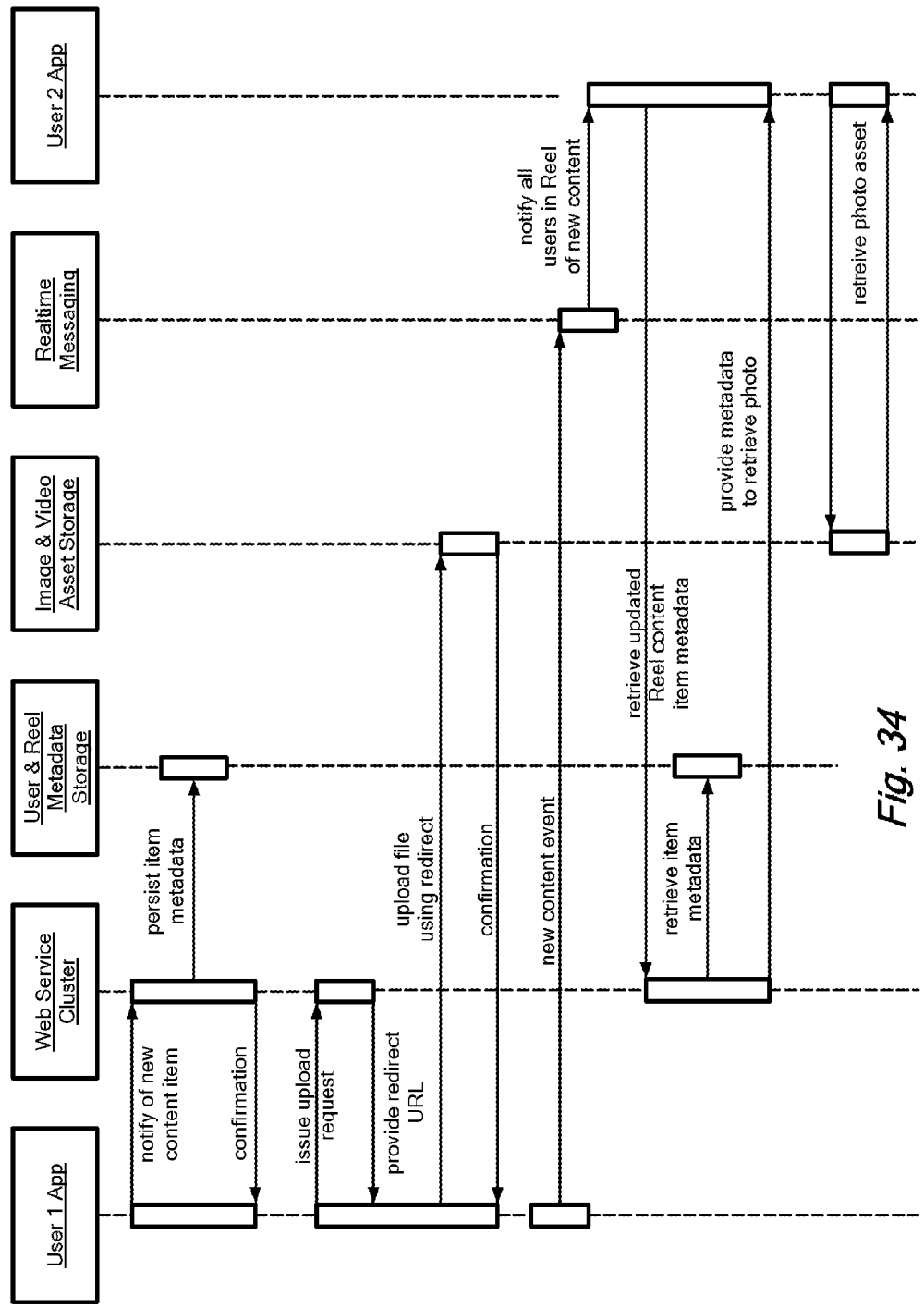
FIG. 34 is a representation of the interactions that take place between the application and several components of the server infrastructure which occur when the first user in a collaborative CoCreation session within a given Reel captures an image or short video clip on their device, with that image or video clip being distributed to the second user within the given Reel (and any other users in that Reel)

FIG. 34 is a representation of the interactions that take place between the application and several components of the server infrastructure which occur when the first user in a collaborative CoCreation session within a given Reel captures an image or short video clip on their device, with that image or video clip being distributed to the second user within the given Reel (and any other users in that Reel).

Figure 35:
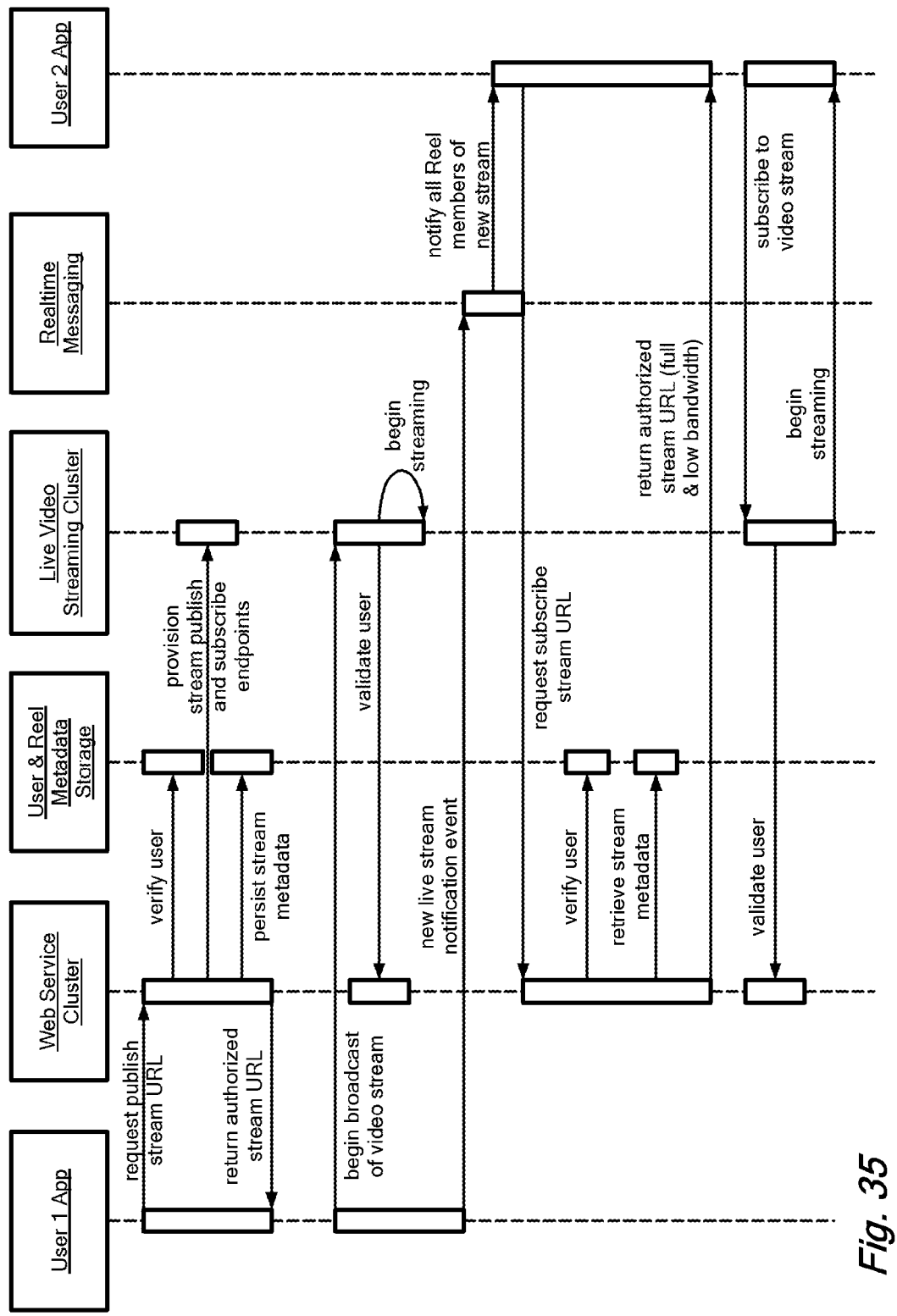
FIG. 35 is a representation of the interactions that take place between the application and several components of the server infrastructure which occur when a live video stream is initiated from the first user's mobile device to be broadcast to the second user within the same Reel (and any other users in that Reel)

FIG. 35 is a representation of the interactions that take place between the application and several components of the server infrastructure which occur when a live video stream is initiated from the first user's mobile device to be broadcast to the second user within the same Reel (and any other users in that Reel).

Figure 36:
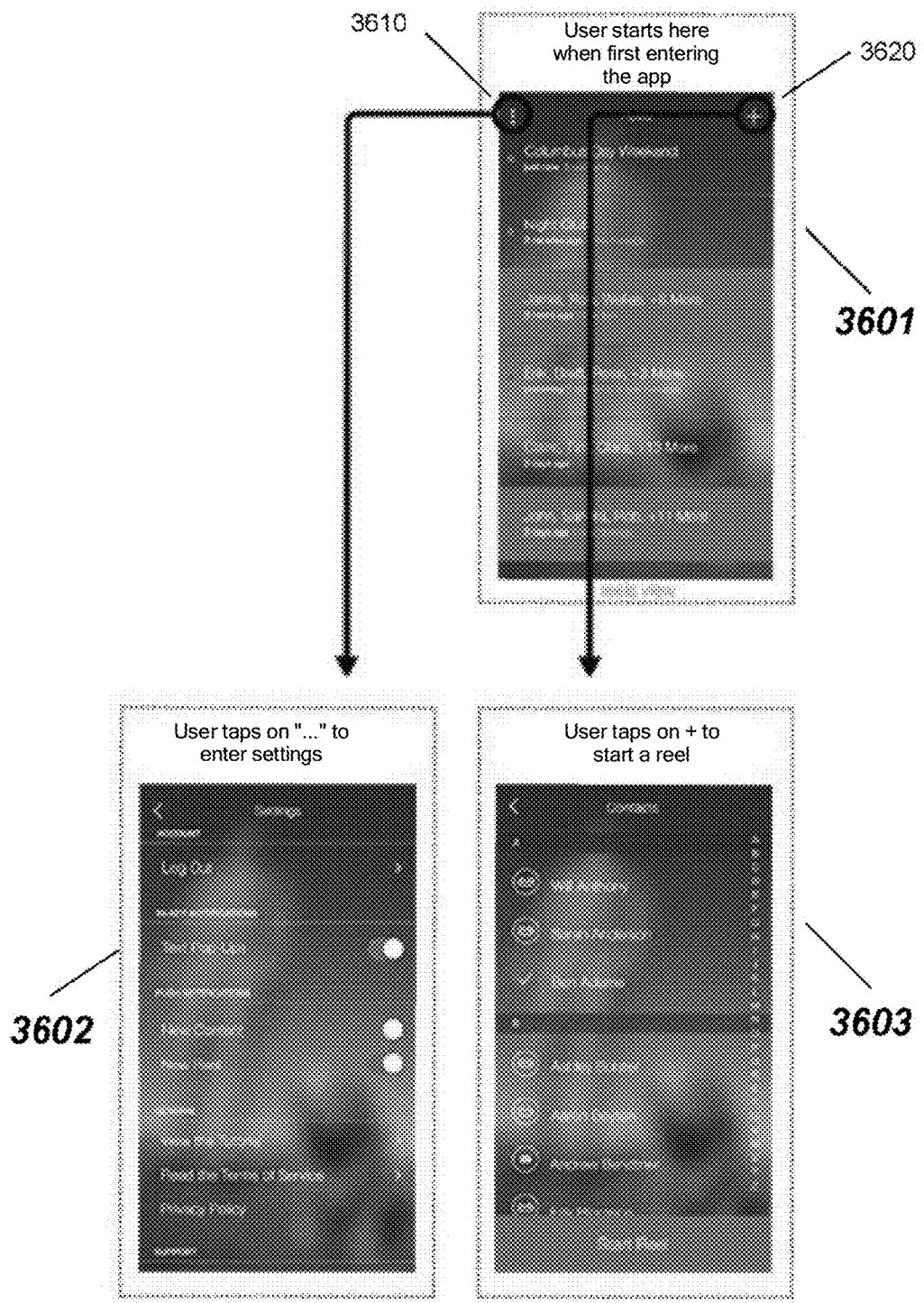
FIGS. 36-38 show representative views of the Reel application running on a mobile device, in accordance with one specific alternative embodiment.
Figure 37:
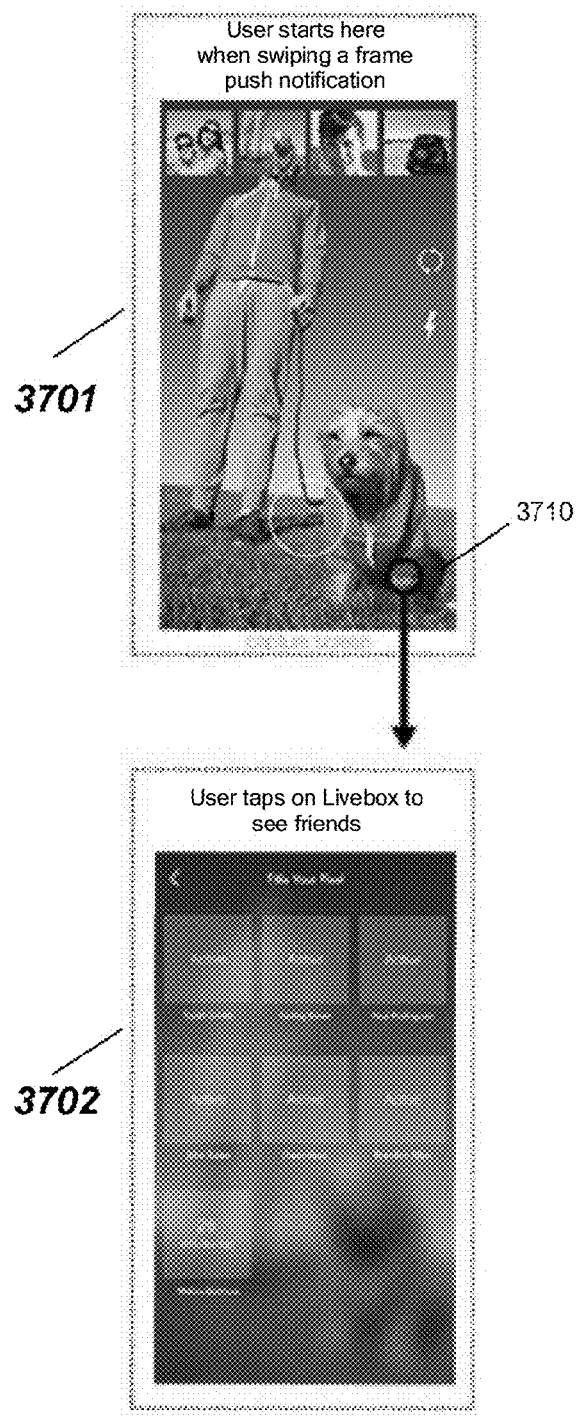
Figure 38:
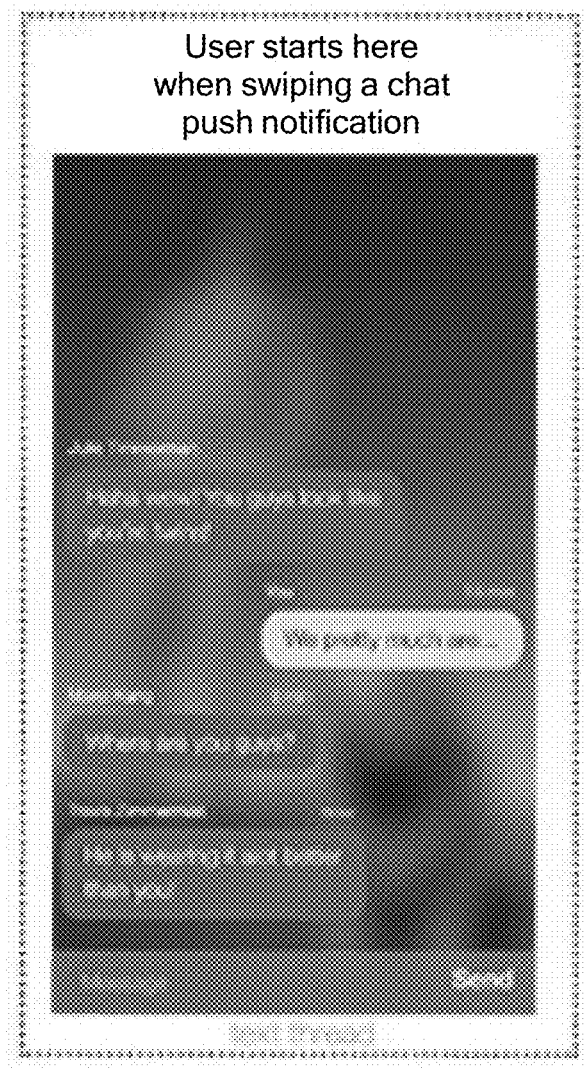

FIGS. 36-38 show representative views of the Reel application running on a mobile device, in accordance with one specific alternative embodiment.

Compared to the main application screen shown in FIG. 1, FIG. 36 shows an alternative format for the main application screen 3601 in which a list of the user's Reels is displayed (referred to here as the "reels view"). From this reels view screen 3601, the user can take certain actions. For example, the user can tap on a particular Reel in order to enter that Reel and get to a capture screen of the type shown in FIG. 37 screen 3701, the user can tap on the "settings" button 3610 to open a settings screen of the type shown in FIG. 36 screen 3602, or the user can tap on the "+" icon 3620 to get to a screen of the type shown in FIG. 36 screen 3603 from which the user can start a new reel (referred to here as a "Start Reel" screen).

From the capture screen shown in FIG. 37 screen 3701, the user can perform the types of functions described above with reference to FIGS. 7-11, including capturing content from any of a variety of local and remote sources and include the captured content in the Reel. The user also can tap the livebox button 3710 to get to a livebox screen of the type shown in FIG. 37 screen 3702 from which the user can perform functions of the type described above with reference to FIG. 12. From the capture screen 3701, the user can "swipe" right to return to the main application screen 3601 or can "swipe" left to get to a text thread screen of the type shown in FIG. 38. If the user enables pop-up text messages, then a text message may be displayed on this screen 3701 automatically when a text message is received from another member of the Reel, substantially as described above with reference to FIG. 14.

From the text thread screen shown in FIG. 38, the user can perform functions of the type describe above with reference to FIG. 15, such as receiving text messages from other users and sending text messages, where the text messages may be displayed over picture or video content associated with the Reel as discussed above. From the text thread screen, the user also can "swipe" right to return to the capture screen 3701.

The settings screen shown in FIG. 36 screen 3602 allows the user to configure certain settings, including whether to allow pop-up text messages and whether to receive push notifications when new content and/or a new reel is added.

The Start Reel screen shown in FIG. 36 screen 3603 allows the user to perform functions of the type described above with reference to FIG. 2, including selecting people from the user's contacts to invite to the Reel.

The livebox screen shown 3702 allows the user to perform functions of the type described above with reference to FIG. 12. Among other things, this screen shows users that are participating in a Reel, with indications of which users are currently streaming live video from their mobile device, which users are not streaming but are active, and which users are currently inactive in the given Reel.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions. Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should be noted that terms such as "client," "server," and "mobile device" may be used herein to describe devices that may be used in certain embodiments of the present invention and should not be construed to limit the present invention to any particular device type unless the context otherwise requires. Thus, a device may include, without limitation, a node, server, computer, appliance, or other type of device (where mobile devices such as smart phones and tablets essentially are computers). Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. Apparatus comprising a tangible, non-transitory computer-readable medium encoded with instructions that when run on a mobile device provide an application used in implementing a method of capturing and sharing content items among a plurality of mobile devices in communication with a server infrastructure over a network, wherein each mobile device runs the application and the application establishes its user as a party to a forum that shares a reel of content items via the server infrastructure, the method comprising:
   receiving by the application running on a first mobile device, from the server infrastructure, a content item associated with the reel of content items; and
   causing display, by the application, of a first co-create screen on a display of the first mobile device, the first screen including:
      (i) a main display area;
      (ii) an album area comprising a set of user-selectable album panes in which recorded content items associated with the reel are displayed; and
      (iii) a user-selectable capture control allowing the user (a) to selectively capture content from the main display area and (b) to cause posting of the captured content to the reel as a recorded content item;
   wherein causing display includes causing display of the received content item in the main display area of the first screen, and wherein the user-selectable capture control allows the user to selectively capture content from the received content item;
   wherein the received content item includes a live video stream from another party to the forum; and
   wherein the method further comprises:
   causing, by the application, display of a user-selectable livebox pane overlaying a portion of the main display area of the first album screen;
   causing, by the application, display of video from a camera of the first mobile device in the user-selectable livebox pane of the first screen;
   causing, by the application, a multi-party conferencing connection to be established between the user of the first mobile device and such other party to the forum; and
   responsive to receipt of an input, from the user, such input selecting the user-selectable livebox pane, causing, by the application, display of a multiview screen including a plurality of user-selectable panes, each pane associated with a distinct party to the forum and each pane displaying one of at least:
      a representation, derived by the server infrastructure from a live video stream being sent to the server infrastructure from a mobile device of such party, wherein the representation is dynamically updated in a low-bandwidth manner by the server infrastructure; or
      an indication that such party is not sending a live video stream to the server infrastructure.

2. Apparatus according to claim 1, wherein the received content item includes a one-way video that is made available to parties to the forum.

3. Apparatus according to claim 1, wherein the method further comprises:
   causing, by the application, display of a user-selectable camera control allowing a user to select a front camera of the first mobile device or a back camera of the first mobile device.

4. Apparatus according to claim 1, wherein each pane displays one of:
   the representation; or
   an indication that such party is online but is not sending a live video stream to the server infrastructure; or
   an indication that such party is offline.

5. Apparatus according to claim 1, wherein the method further comprises:

responsive to receipt of an input, from the user, such input selecting the user-selectable livebox pane, causing, by the application, display of a second multiview screen including:
(i) a main display area in which is displayed video from the camera of the first mobile device,
(ii) the user-selectable live box pane in which is present the received content, and
(iii) the user-selectable capture control allowing the user (a) to selectively capture content from the main display area of the second multiview screen and (b) to cause posting of the captured content to the reel as a recorded content item.

6. Apparatus according to claim 5, wherein causing, by the application, display of the second multiview screen does not interrupt the multi-party video-conferencing connection.

7. Apparatus according to claim 5, wherein the method further comprises:

responsive to receipt of a second input, from the user, such input selecting the user-selectable livebox pane, causing, by the application, display of a multiview screen including a plurality of user-selectable panes, each pane associated with a distinct party to the forum and each pane displaying one of at least:
a representation, derived by the server infrastructure from a live video stream being sent to the server infrastructure from a mobile device of such party, wherein the representation is dynamically updated in a low-bandwidth manner by the server infrastructure; or
an indication that such party is not sending a live video stream to the server infrastructure.

8. Apparatus according to claim 7, wherein each pane displays one of:
the representation; or
an indication that such party is online but is not sending a live video stream to the server infrastructure; or
an indication that such party is offline.

9. Apparatus according to claim 1, wherein the method further comprises:

causing, by the application, a multi-party conferencing connection to be established between the user of the first mobile device and such other party to the forum; and
causing, by the application, display of a user-selectable camera-disable control allowing the user of the first mobile device to selectively enable and disable a local camera of the first mobile device, wherein the multi-party conferencing connection remains established regardless of whether the local camera is enabled or disabled, and when the local camera is enabled, the application sends a live video stream from the local camera to the server infrastructure for use over the multi-party conferencing connection.

10. Apparatus according to claim 1, wherein the method further comprises:

causing, by the application, display of the received content item in a user-selectable album pane in the album area of the first album screen; and
upon receipt of a user input selecting such user-selectable album pane, causing, by the application, display of a second album screen including:
(i) a main content area in which is displayed the received content item; and
(ii) the user-selectable capture control allowing the user (a) to selectively capture content from the main content area of the second album screen and (b) to cause posting of the captured content to the reel as a recorded content item.

11. Apparatus according to claim 1, wherein the method further comprises:

causing, by the application, display of video from a camera of the first mobile device in the main display area; and
during display of such video from the camera of the first mobile device, causing display, by the application of the user-selectable capture control allowing the user to selectively capture content from such video.

12. Apparatus according to claim 1, wherein posting of the captured content to the reel as a recorded content item comprises:
displaying the captured content in a user-selectable pane in the album area; and
sending the captured content to the server infrastructure to allow other parties to the forum to receive the captured content.

13. Apparatus according to claim 1, wherein the application allows the user to selectively post a captured content item to the reel as either a persistent recorded content item or a decayable recorded content item.

14. Apparatus according to claim 1, wherein the method further comprises:

responsive to receipt of a user input selecting one of the user-selectable panes of the multiview screen, wherein the pane displays the representation, causing, by the application, display of a third multiview screen including:
(i) a main content area in which is displayed a live video stream from selected one of the parties to the forum; and
(ii) the user-selectable capture control allowing the user (a) to selectively capture content from the main content area of the third multiview screen and (b) to cause posting of the captured content to the reel as a recorded content item.

15. Apparatus according to claim 11, wherein the method further comprises:

responsive to receipt of a user input selecting one of the user-selectable panes of the multiview screen, wherein the pane displays the representation, causing, by the application, display of a third multiview screen including:
(i) a main content area in which is displayed a live video stream from selected one of the parties to the forum; and
(ii) the user-selectable capture control allowing the user (a) to selectively capture content from the main content area of the third multiview screen and (b) to cause posting of the captured content to the reel as a recorded content item.

16. Apparatus according to claim 1, wherein the method further comprises:

responsive to receipt of a text message from another party to the forum, causing, by the application, display of a pop-up text message window overlaying a portion of the main display area, the pop-up text message window displaying the received text message.

17. Apparatus comprising a tangible, non-transitory computer-readable medium encoded with instructions that when run on a mobile device provide an application used in implementing a method of capturing and sharing content items among a plurality of mobile devices in communication with a server infrastructure over a network, wherein each mobile device runs the application and the application establishes its user as a party to a forum that shares a reel of content items via the server infrastructure, the method comprising:

receiving by the application running on a first mobile device, from the server infrastructure, a content item associated with the reel of content items; and causing display, by the application, of a first co-create screen on a display of the first mobile device, the first screen including:
  (i) a main display area;
  (ii) an album area comprising a set of user-selectable album panes in which recorded content items associated with the reel are displayed; and
  (iii) a user-selectable capture control allowing the user (a) to selectively capture content from the main display area and (b) to cause posting of the captured content to the reel as a recorded content item;

wherein causing display includes causing display of the received content item in the main display area of the first screen, and wherein the user-selectable capture control allows the user to selectively capture content from the received content item;

wherein the received content item includes a live video stream from another party to the forum; and wherein the method further comprises:

causing, by the application, display of a user-selectable livebox pane overlaying a portion of the main display area of the first album screen;

causing, by the application, display of video from a camera of the first mobile device in the user-selectable livebox pane of the first screen;

causing, by the application, a multi-party conferencing connection to be established between the user of the first mobile device and such other party to the forum;

responsive to receipt of an input, from the user, such input selecting the user-selectable livebox pane, causing, by the application, display of a second multiview screen including:
  (i) a main display area in which is displayed video from the camera of the first mobile device,
  (ii) the user-selectable live box pane in which is present the received content, and
  (iii) the user-selectable capture control allowing the user (a) to selectively capture content from the main display area of the second multiview screen and (b) to cause posting of the captured content to the reel as a recorded content item; and responsive to receipt of a second input, from the user, such input selecting the user-selectable livebox pane, causing, by the application, display of a multiview screen including a plurality of user-selectable panes, each pane associated with a distinct party to the forum and each pane displaying one of at least:
  a representation, derived by the server infrastructure from a live video stream being sent to the server infrastructure from a mobile device of such party, wherein the representation is dynamically updated in a low-bandwidth manner by the server infrastructure; or
  an indication that such party is not sending a live video stream to the server infrastructure.

18. Apparatus according to claim 17, wherein the received content item includes a one-way video that is made available to parties to the forum.

19. Apparatus according to claim 17, wherein the method further comprises:

causing, by the application, display of a user-selectable camera control allowing a user to select a front camera of the first mobile device or a back camera of the first mobile device.

20. Apparatus according to claim 17, wherein the method further comprises:

responsive to receipt of an input, from the user, such input selecting the user-selectable livebox pane, causing, by the application, display of a multiview screen including a plurality of user-selectable panes, each pane associated with a distinct party to the forum and each pane displaying one of at least:
  a representation, derived by the server infrastructure from a live video stream being sent to the server infrastructure from a mobile device of such party, wherein the representation is dynamically updated in a low-bandwidth manner by the server infrastructure; or
  an indication that such party is not sending a live video stream to the server infrastructure.

21. Apparatus according to claim 20, wherein each pane displays one of:
 the representation; or
 an indication that such party is online but is not sending a live video stream to the server infrastructure; or
 an indication that such party is offline.

22. Apparatus according to claim 17, wherein causing, by the application, display of the second multiview screen does not interrupt the multi-party video-conferencing connection.

23. Apparatus according to claim 17, wherein each pane displays one of:
 the representation; or
 an indication that such party is online but is not sending a live video stream to the server infrastructure; or
 an indication that such party is offline.

24. Apparatus according to claim 17, wherein the method further comprises:

causing, by the application, a multi-party conferencing connection to be established between the user of the first mobile device and such other party to the forum; and causing, by the application, display of a user-selectable camera-disable control allowing the user of the first mobile device to selectively enable and disable a local camera of the first mobile device, wherein the multi-party conferencing connection remains established regardless of whether the local camera is enabled or disabled, and when the local camera is enabled, the application sends a live video stream from the local camera to the server infrastructure for use over the multi-party conferencing connection.

25. Apparatus according to claim 17, wherein the method further comprises:

causing, by the application, display of the received content item in a user-selectable album pane in the album area of the first album screen; and upon receipt of a user input selecting such user-selectable album pane, causing, by the application, display of a second album screen including:
  (i) a main content area in which is displayed the received content item; and
  (ii) the user-selectable capture control allowing the user (a) to selectively capture content from the main content area of the second album screen and (b) to cause posting of the captured content to the reel as a recorded content item.

26. Apparatus according to claim 17, wherein the method further comprises:

causing, by the application, display of video from a camera of the first mobile device in the main display area; and during display of such video from the camera of the first mobile device, causing display, by the application of the user-selectable capture control allowing the user to selectively capture content from such video.

27. Apparatus according to claim 17, wherein posting of the captured content to the reel as a recorded content item comprises:

displaying the captured content in a user-selectable pane in the album area; and sending the captured content to the server infrastructure to allow other parties to the forum to receive the captured content.

28. Apparatus according to claim 17, wherein the application allows the user to selectively post a captured content item to the reel as either a persistent recorded content item or a decayable recorded content item.

29. Apparatus according to claim 20, wherein the method further comprises:

responsive to receipt of a user input selecting one of the user-selectable panes of the multiview screen, wherein the pane displays the representation, causing, by the application, display of a third multiview screen including:
(i) a main content area in which is displayed a live video stream from selected one of the parties to the forum; and
(ii) the user-selectable capture control allowing the user (a) to selectively capture content from the main content area of the third multiview screen and (b) to cause posting of the captured content to the reel as a recorded content item.

30. Apparatus according to claim 17, wherein the method further comprises:

responsive to receipt of a user input selecting one of the user-selectable panes of the multiview screen, wherein the pane displays the representation, causing, by the application, display of a third multiview screen including:
(i) a main content area in which is displayed a live video stream from selected one of the parties to the forum; and
(ii) the user-selectable capture control allowing the user (a) to selectively capture content from the main content area of the third multiview screen and (b) to cause posting of the captured content to the reel as a recorded content item.

31. Apparatus according to claim 17, wherein the method further comprises:

responsive to receipt of a text message from another party to the forum, causing, by the application, display of a pop-up text message window overlaying a portion of the main display area, the pop-up text message window displaying the received text message.

* * * * *